(12) United States Patent
Ha et al.

(10) Patent No.: US 12,039,467 B2
(45) Date of Patent: Jul. 16, 2024

(54) COLLABORATIVE SYSTEM AND METHOD FOR VALIDATING EQUIPMENT FAILURE MODELS IN AN ANALYTICS CROWDSOURCING ENVIRONMENT

(71) Applicant: Caterpillar Inc., Peoria, IL (US)

(72) Inventors: Christopher Ha, Champaign, IL (US); Chau Le, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 190 days.

(21) Appl. No.: 17/316,978

(22) Filed: May 11, 2021

(65) Prior Publication Data

US 2021/0365449 A1 Nov. 25, 2021

Related U.S. Application Data

(60) Provisional application No. 63/027,880, filed on May 20, 2020.

(51) Int. Cl.

| | |
|---|---|
| *G06F 16/00* | (2019.01) |
| *G06F 16/23* | (2019.01) |
| *G06F 16/2458* | (2019.01) |
| *G06F 18/21* | (2023.01) |
| *G06F 18/2413* | (2023.01) |
| *G06N 5/022* | (2023.01) |
| *G06N 20/00* | (2019.01) |
| *G06Q 10/00* | (2023.01) |
| *G06V 10/778* | (2022.01) |

(52) U.S. Cl.
CPC ......... *G06Q 10/00* (2013.01); *G06F 16/2358* (2019.01); *G06F 16/2465* (2019.01); *G06F 16/2477* (2019.01); *G06F 18/2185* (2023.01); *G06F 18/2413* (2023.01); *G06N 5/022* (2013.01); *G06N 20/00* (2019.01); *G06F 2216/03* (2013.01); *G06V 10/7788* (2022.01)

(58) Field of Classification Search
None
See application file for complete search history.

(56) References Cited

U.S. PATENT DOCUMENTS

| | | | |
|---|---|---|---|
| 8,417,715 B1 * | 4/2013 | Bruckhaus | G06Q 10/04 705/26.1 |
| 9,098,617 B1 * | 8/2015 | Pauley, Jr. | G06F 11/3604 |
| 9,262,493 B1 * | 2/2016 | Dietrich | G06F 16/254 |
| 9,594,849 B1 * | 3/2017 | Todd | G06F 16/90 |
| 9,710,767 B1 * | 7/2017 | Dietrich | G06Q 10/063 |
| 9,798,788 B1 * | 10/2017 | Reiner | G06F 16/254 |
| 10,142,204 B2 | 11/2018 | Nickolov | |

(Continued)

*Primary Examiner* — Jean M Corrielus

(57) ABSTRACT

A method for dynamically creating and validating a predictive analytics model to transform data into actionable insights the method comprising: identifying an event, selectively tagging, based on analytics expertise, at least one time series data area (data area), where the identified event occurred, comparing data area where the identified event is tagged with the data area where the identified event is not tagged, building, based on analytics expertise, the predictive analytics model embodying the classification generated by selective tagging, displaying the visual indicia generated by executing the predictive analytics model, and validating the predictive model based on a feedback from at least one domain expert.

14 Claims, 34 Drawing Sheets

(56) References Cited

U.S. PATENT DOCUMENTS

| | | | | |
|---|---|---|---|---|
| 2002/0065698 A1* | 5/2002 | Schick | G07C 5/0841 |
| | | | 705/333 |
| 2003/0018513 A1* | 1/2003 | Hoffman | G06Q 10/087 |
| | | | 705/28 |
| 2003/0023520 A1* | 1/2003 | Burk | G06Q 30/0283 |
| | | | 705/400 |
| 2003/0055666 A1* | 3/2003 | Roddy | G07C 5/008 |
| | | | 705/305 |
| 2003/0078787 A1* | 4/2003 | Hoffman | G06Q 10/06 |
| | | | 705/80 |
| 2003/0078818 A1* | 4/2003 | Hoffman | G06Q 10/06 |
| | | | 705/35 |
| 2003/0088449 A1* | 5/2003 | Menninger | G06Q 10/087 |
| | | | 705/28 |
| 2003/0088474 A1* | 5/2003 | Hoffman | G06Q 30/0609 |
| | | | 705/26.8 |
| 2003/0097317 A1* | 5/2003 | Burk | G06Q 10/06 |
| | | | 705/30 |
| 2004/0193482 A1* | 9/2004 | Hoffman | G06Q 10/06 |
| | | | 705/14.69 |
| 2011/0208567 A9* | 8/2011 | Roddy | G06Q 10/0637 |
| | | | 705/305 |
| 2013/0332241 A1* | 12/2013 | Taylor | G06Q 10/0637 |
| | | | 705/7.36 |
| 2014/0095554 A1* | 4/2014 | Thomeer | G06F 16/9535 |
| | | | 707/821 |
| 2014/0336984 A1 | 11/2014 | Starr | |
| 2015/0317337 A1* | 11/2015 | Edgar | G16H 50/70 |
| | | | 707/751 |
| 2016/0127549 A1* | 5/2016 | Sharma | H04M 3/42357 |
| | | | 379/112.09 |
| 2016/0357175 A1* | 12/2016 | Verma | H04L 12/6418 |
| 2016/0371406 A1* | 12/2016 | Nicholas | G06F 9/46 |
| 2016/0371584 A1* | 12/2016 | Nicholas | G05B 23/0286 |
| 2016/0371585 A1* | 12/2016 | McElhinney | G06F 9/46 |
| 2016/0371616 A1* | 12/2016 | Nicholas | G01D 3/08 |
| 2017/0053242 A1* | 2/2017 | Ayyaswami | G06F 16/22 |
| 2017/0078392 A1* | 3/2017 | Gray | H04L 67/02 |
| 2017/0262818 A1* | 9/2017 | Horrell | G06Q 10/067 |
| 2018/0174056 A1* | 6/2018 | Madison | G06Q 10/06375 |
| 2018/0193579 A1 | 7/2018 | Hanrahan | |
| 2018/0225578 A1* | 8/2018 | Vyas | G06Q 10/20 |
| 2018/0330261 A1* | 11/2018 | Melli | G06F 17/18 |
| 2019/0188797 A1* | 6/2019 | Przechocki | H04L 67/125 |
| 2019/0265971 A1 | 8/2019 | Behzadi | |
| 2020/0005160 A1* | 1/2020 | Vial | G06N 5/02 |
| 2020/0005161 A1* | 1/2020 | Dulian | G06N 20/00 |
| 2020/0151588 A1* | 5/2020 | Doan Huu | G06N 20/00 |
| 2020/0349390 A1* | 11/2020 | Konwar | G06F 18/2185 |

\* cited by examiner

Fleet setup

Filter...         New

Site 2
Site 1

Name
Site 2

Description
Description

Selected machines
LAJ00383
  Site: Site 1 Customer: Customer 1
LAJ00384
  Site: Site 2 Customer: Customer 2
LAJ00385
  Site: Site 3 Customer: Customer 3
LAJ00387
  Site: Site 4 Customer: Customer 4
LAJ00389

Delete — 2606

Edit machine list — 2604

Cancel — 2608
Save — 2610

My histograms

Filter...

Site 1

New

Name
Site 2

Description
Description

Start date          End date
10/01/2019          10/30/2019

Number of bins
20

Channels  + Add new channel
Air Filter #1 Restriction    X    0    4
         2802      2804
Machines
● by select fleet    ○ by select machines
Site 2

Delete — 2806

Close
Create — 2808
View plots — 2810

COLLABORATIVE SYSTEM AND METHOD FOR VALIDATING EQUIPMENT FAILURE MODELS IN AN ANALYTICS CROWDSOURCING ENVIRONMENT

TECHNICAL FIELD

The present disclosure relates to validation of analytics models. More particularly, the present disclosure relates to a system for on-boarding and validating analytics models in a crowdsourcing environment.

BACKGROUND

For industrial equipment manufacturers and organizations investing in cost effective operation of equipment, various software applications are used to conduct the arduous task of monitoring the health conditions of equipment operations associated therewith. Examples of equipment may include construction machines, such as trucks, cranes, earth moving vehicles, mining vehicles, backhoes, material handling equipment, transportation equipment, petroleum and refining equipment, farming equipment, and the like. Equipment maintenance measures have become highly sophisticated generating significant volumes of data where certain aspects of this data may be repeatedly extracted, stored, modified and analyzed by different applications. For example, a first application may conduct a health check of a set of equipment in a fleet. The health check may be based on several factors such as machine sensor data, diagnostic or warning contents, maintenance and repair history, application segmentation and severity, machine age and service hours. The machine health check or evaluation operation may be conducted through an application with an end-to-end solution, i.e., where an evaluation technician or user can first collect and store data from various data sources, and second, extract, modify, and analyze the aforementioned data, and finally store, view and evaluate the analysis and related results output.

It may be further understood that the same data is typically generated and used by many other applications executed by different users, each of which desiring a specific end-to-end solution not related to evaluating, under the current example, rather generating an independent end-to-end solution. For example, worksite project managers, material supply vendors, and equipment fleet managers may each access the same data but have separate end-to-end solutions.

Employing a strategy where data is regenerated or stored multiple times and used for various end-to-end solutions is typical, however it depletes valuable computer and human resources as it stores, accesses, extracts and modifies the same or identical data. Moreover, as data is currently regenerated for different end-to-end solutions there may be opportunities being lost in that no end-to-end solution benefits from the output generated by operations performed by other end-to-end solutions, since customarily the analysis results, modified data and knowledge generated from each application is independently and separately stored. A need exists whereby a modular application is able to extract data of interest from a common location, conduct analytics operations on the extracted data and store the analytical models, and associated analytics results at a common location where it is accessible by other users.

Current commercial condition monitoring software typically provides an end-to-end solution and some even provide an API to integrate with externally developed analytics models. However, using such software is not cost effective in that generally, only a fraction of software code is dedicated for developing and validating new analytics models. For example, if a user decides to create a new analytics model, with current commercial software the user will end up generating a majority of new code with each analytics model. As it currently stands, commercial analytics software wastes valuable computing resources since a majority of the code is replaced when a new analytics model is generated. Moreover, if only a small amount of code is actually reused to create a new analytic model, the cost effective use of data in generating a majority of new code each time is inefficient. Other commercial and open source options may have features that can be leveraged to develop and validate analytics models, but they often require significant integration effort by data scientists or software engineers at a high cost and typically resulting in providing less versatile software options.

The current process of validating analytics models typically involves close engagement between data scientists, condition monitoring advisors (CMA), and non-data scientists who may be experts in condition monitoring each with a wealth of product and industry knowledge. Therefore, there currently exists little or no means to efficiently and cost effectively conduct validation of analytics models in real time where data scientists and non-data scientists can constructively interact with CMAs to generate analytics models.

As it relates to the data scientist role in developing analytics models these individuals typically use commercial software, specially developed in-house software, or open-source web applications such as Jupyter notebook for analytics model development. Moreover it is uncommon for data scientists to consider, crowdsourcing to generate analytical models and furthermore there generally lacks a commercial solution which allows for data scientists interacting with crowdsourcing in developing analytics models. Therefore, there is a need to develop an easy-to-use application where multiple data scientists can easily migrate models and validate these migrated models with reference to benchmark data in real time in coordination with CMAs.

As it relates to the input versatility of current data scientists' modeling processes, compartmentalized analytics modeling is ineffective since these processes lack the ability to share valuable insight to developers of other analytics models and benefit from the insight of the developers of other analytics models.

Moreover, such integrated capability for current platforms such as Python-based models is not readily available in commercial tools, although some commercial software has limited means such as an API to integrate with externally developed Python models. Even with this limited functionality, having an API is not cost effective.

U.S. Patent Application No. 2019,0265,971 ("the '971 patent application") by Behzadi et al., filed on Aug. 29, 2019, discloses a method for IoT data processing and enterprise applications. This application describes an omnibus software application development platform for enterprise applications, where applications are generated by first integrating data from various sources using diverse data types or data structures, and subsequently generating abstract representations of data and correlations of the data, using a model-driven architecture. The '971 patent application suggests that the abstract representations of algorithms, the data, and the data correlations enable the data to be processed using one or more of the plurality of algorithms without requiring knowledge of a structure, logic, or inter-relationship of the plurality of algorithms or the different data types or data structures. A supply network risk analytics model is described for generating recommendations and options for management teams to mitigate high risk areas of the supply chain and improve supplier planning and supplier portfolio management to create appropriate redundancy, backup, and recovery options where needed. Therefore, current analytics modeling using off the shelf commercial software or open source options lack versatility in features and possess little if any means to integrate models and inputs from multiple sources. Moreover, current analytics modeling lacks a full suite of inputs since there is little if any means to integrate crowdsource analytics input with traditional engineering and data science input. and any non-scientists' input.

SUMMARY OF THE INVENTION

A computer implemented system for dynamically creating and validating a predictive analytics model to transform data into actionable insights the system comprising: an analytics server communicatively connected to: (a) a sensor configured to acquire real-time data output from an electrical system, and (b) a terminal configured to display an indicia of a set of analytics server operations; the analytics server comprising: an event identification circuitry for identifying an event, a tagging circuitry for selectively tagging, based on analytics expertise, at least one time series data area (data area), where the identified event occurred, decision engine for comparing data area where the identified event is tagged with the data area where the identified event is not tagged, an analytics modeling engine for building, based on analytics expertise, the predictive analytics model embodying the classification generated by selective tagging, a terminal communicatively connected to the analytics server and configured to display the visual indicia generated by executing the predictive analytics model, and a feedback engine for validating the predictive model based on a feedback from at least one domain expert.

A method for dynamically creating and validating a predictive analytics model to transform data into actionable insights the method comprising: identifying an event, selectively tagging, based on analytics expertise, at least one time series data area (data area), where the identified event occurred, comparing data area where the identified event is tagged with the data area where the identified event is not tagged, building, based on analytics expertise, the predictive analytics model embodying the classification generated by selective tagging, displaying the visual indicia generated by executing the predictive analytics model, and validating the predictive model based on a feedback from at least one domain expert.

These and other features, aspects, and embodiments of the invention are described below in the section entitled "Detailed description."

BRIEF DESCRIPTION OF THE DRAWINGS

FIG. 9 enumerates an example of a list of machines that had reported the selected exception in the near past.

FIG. 21 depicts interface where user can create, edit, save or publish derived channels according to one embodiment of the disclosed invention.

FIG. 22 shows an exemplary interface user can modify and test an algorithm for deriving new channels according to a preferred embodiment of the disclosed invention.

FIG. 25 enumerates a list of machines that are to be added to a fleet according to one embodiment of the disclosed invention.

FIG. 26 shows an exemplary interface where a newly created fleet as being added to the fleet setup interface.

FIG. 28 indicates an exemplary interface through which user can provide parameters for generating a histogram.

DETAILED DESCRIPTION

Why Python:

Python is widely used programming language by engineers and data scientists for developing high value advanced analytics models. The current on-boarding and validating process of a typical analytics model is a time consuming and tedious process, particularly when the validation must engage condition monitoring advisors and CMAs, who may be dealer employees and generally possess dissimilar backgrounds as compared to the data scientists generating the advanced analytics models.

Many advanced data scientists develop their models using Jupyter notebook, a free-form text editing web application that can execute Python or R syntax and libraries. In other words, all tasks including data searching, data ingesting, data preparation, algorithm developing, model execution, results viewing, etc. typically require being coded using Python syntax. Jupyter is an analytics tool widely used by advanced data scientists. However, non-data scientists that are accepted as community members are envisioned to be involved in development and validation of analytics models. Therefore, it may be understood that Jupyter is not an easy to use tool for non-data scientists community members, such as, CMAs, engineers, subject matter experts and the like.

Why Crowdsourcing:

The disclosed system integrates various data sources, data views and rules-based failure models used by analytics crowdsourcing environment for validation. The disclosed system supports instantaneous visualization of time-series data overlaid with exceptions with little or no lag. The disclosed system provides for dynamic visualization of time-series data overlaid with exceptions in real time. A community member has the ability to create and experiment with analytics models in real time. The experimentation can for example comprise selecting data to be processed by the newly created analytics models and viewing the data visualization interface generated by the newly created model after processing the selected data. The newly created analytics models may use derived channels, as discussed in detail in conjunction with FIG. 21.

Figure 23:
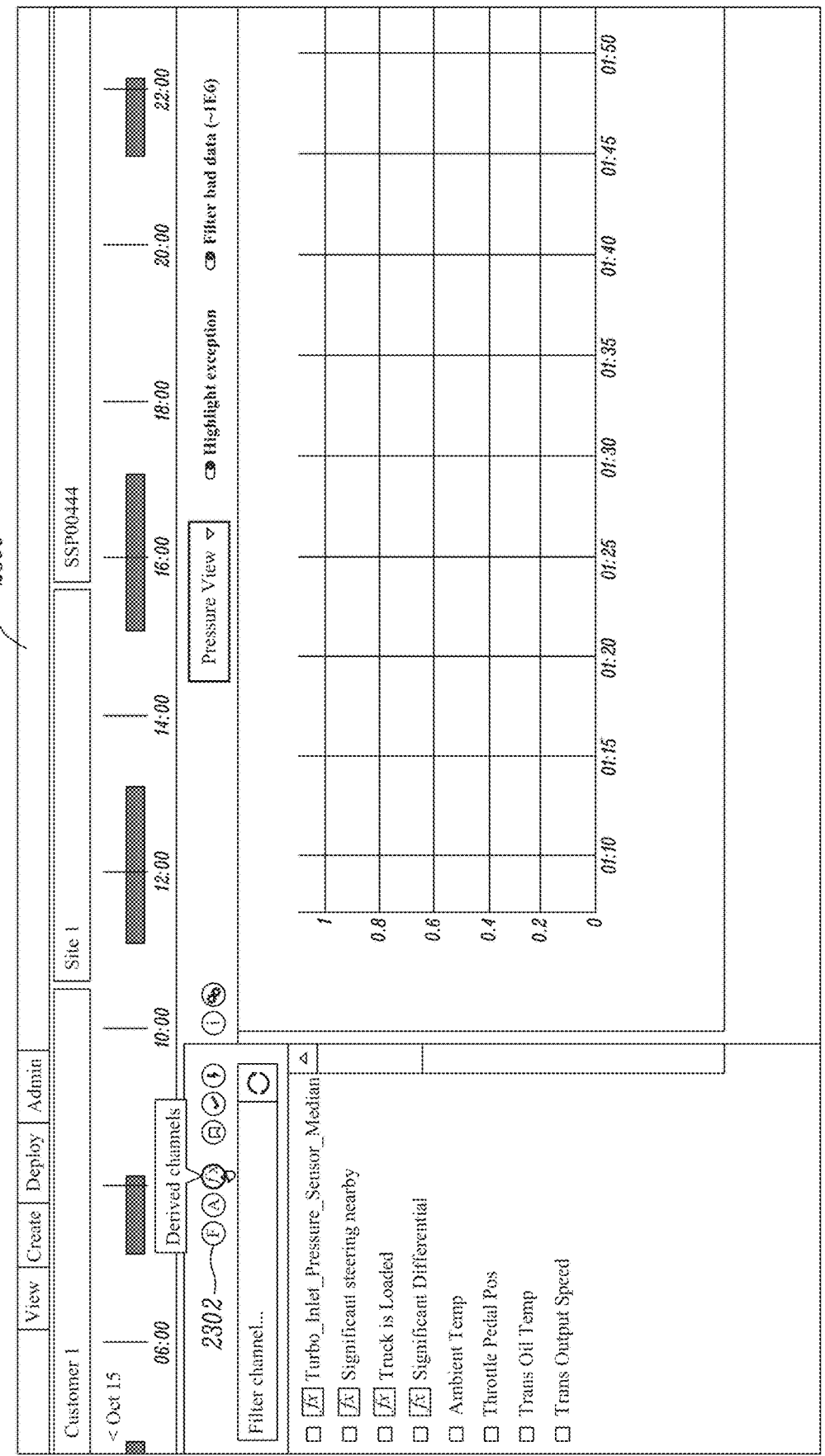
FIG. 23 displays interface allowing user to initiate a fleet creation process.

The system, as shown in FIG. 23, contemplates a community input, i.e. input from the non-data scientist community members in addition to input from the data scientist community, wherein the community members will have the ability to: store and share the templates for creating derived channels, store and share model execution results, and conduct comparative analysis via data visualization as shown in FIG. 23.

The robust analytics models are generated by the disclosed system by effectively leveraging expertise of (1) crowdsourcing community (2) broader data scientists community (3) condition monitoring advisors (CMA) and dealers community expertise derived from years of hands on usage of the system. Interestingly each of these communities bring a different insight into the system and collectively form a sound knowledgebase.

Accordingly, a collaborative internet application is presented to harness insight of multiple communities (crowdsourcing, data scientists, condition monitoring advisors and dealers). The communities can then contribute their expertise and domain knowledge to increase analytics capability of the disclosed system. For example, dealers are often very knowledgeable about a) the products they sell and b) the customers they sell the products to.

This knowledge is thought to be a competitive advantage. Without the feedback from the dealer, data scientists may not know what data customer is looking to access and what exceptions customer would like to see data visualization for. The disclosed system can streamline analytics development and deployment process to dynamically productize analytics models.

Why Collaboration:

The disclosed system provides community members an ability to validate and modify published analytics models. Collectively and iteratively, community members can increase the quantity, accuracy, efficacy and impact of failure model. For example, the data scientist community, the non-data scientist community and the crowdsourcing community can access i.e. view, edit, test, and distribute any of the published analytics model in days instead of months.

The ease of access leads to increased quantity of available failure models, which can, in turn, substantially aide in machine learning. Likewise, the disclosed system contemplates providing community members access to any of the published failure models free of cost thus avoiding the high cost associated with current commercial software packages which lack the robust versatility of the disclosed system. Moreover, the disclosed system enables more efficient validation process generation and more participation from CMAs in validating models. This increased efficiency and accuracy of the model results in higher yield of recommendations.

Figure 1:
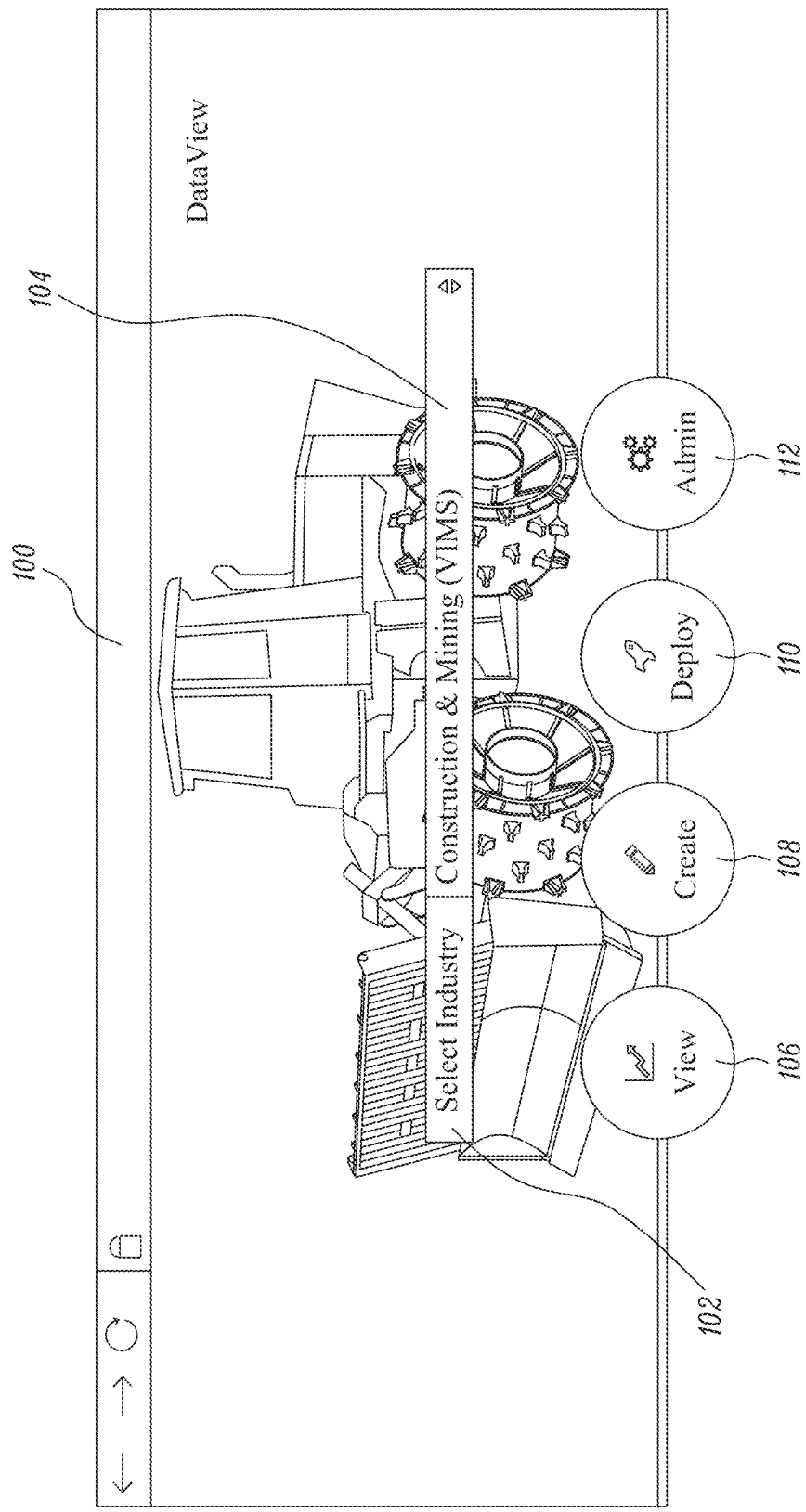
FIG. 1 displays an exemplary interface 100 of the Data-View feature according to one embodiment of the disclosed invention.

Referring to FIG. 1, an exemplary interface 100 is shown according to one embodiment of the disclosed invention. The term "User" is used in this application to indicate a data scientist or a non-data scientist community member (for example, a CMA) who will be using the system according to the disclosed invention. A drop-down list of industries 104 is populated on interface 100 in response to a User selecting a select industry option 102 to specify the industry for which User is seeking to conduct data analysis. By selecting view option 106, User can view interface 200 shown in FIG. 2A. By selecting a create option 108, data scientist can create, fine tune, and back test the analytics model. A single user interface can simultaneously display data visualization 1 along with the python code that was executed to generate the data visualization. Similarly, by selecting a deploy option 110 the data scientist can create a deployment configuration identifying what assets to run, for how long to run, how frequently, using which cloud server options. By selecting admin option 112 an administrative assistant may gain access for authentication, and data/feature entitlement.

Figure 2A:
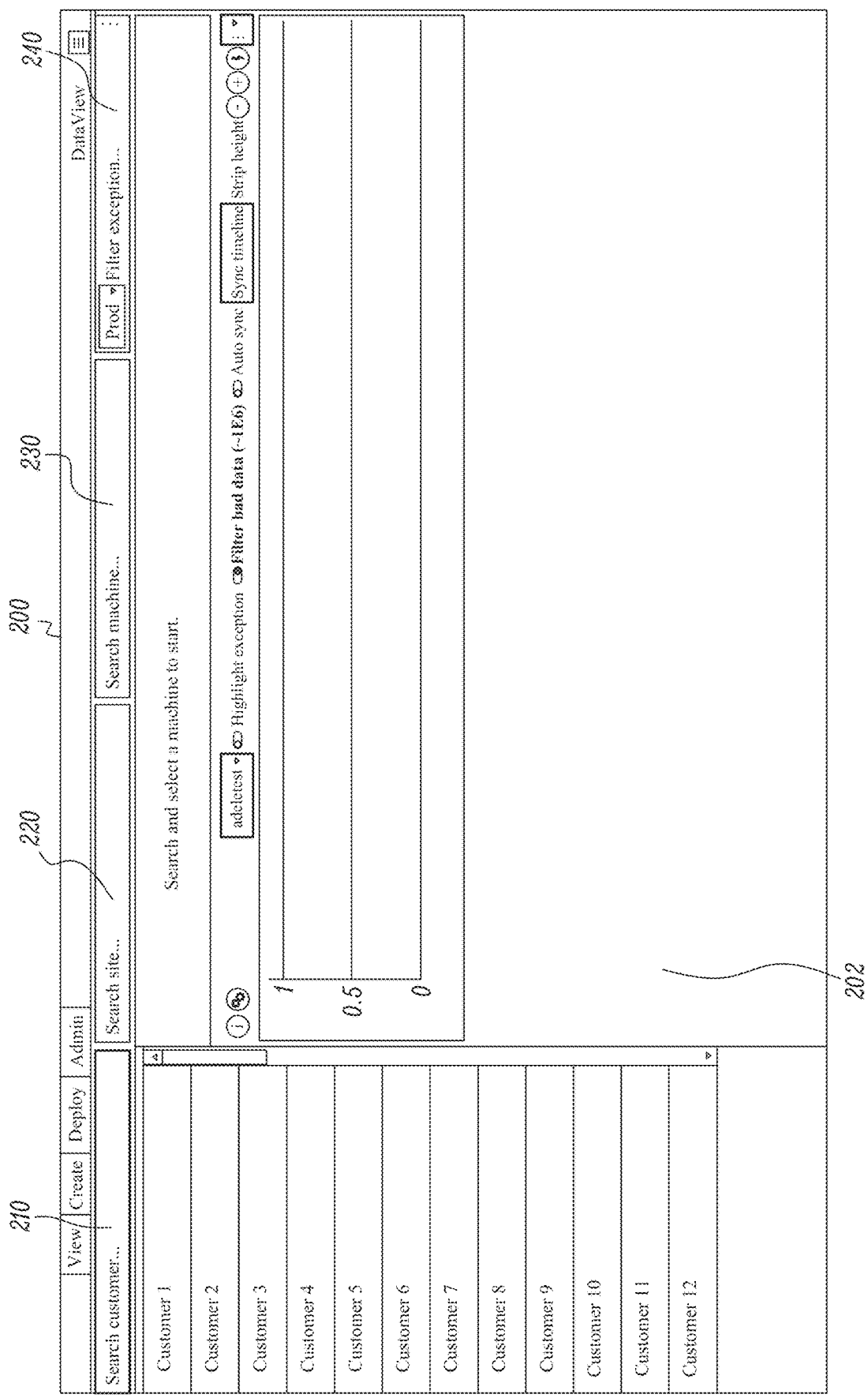
FIGS. 2A, 2B, 2C and 2D illustrate interfaces where user conducts a search by filtering data by a customer name, a site, a machine and an exception respectively.

Turning now to FIG. 2A, displaying interface 200 showing four global filters 210, 220, 230 and 240 is shown. A user may view data of interest after filtering data by: (1) selecting a specific customer name in a customer name selection area 210, (2) selecting a site at a site selection area 220, (3) selecting a machine at a machine selection area 230, or (4) Selecting an exception from the exception selection area 240. Upon User conducting a search by customer name, the system searches a first database to retrieve information pertaining to the specific customer and to cause a display of telemetry data using a first global filter, such as a customer name.

User can provide a customer name either by selecting a customer name from a drop-down list of customer names 202, or user can manually input a customer name in the customer name input area 210. In response to User selecting a customer name, a list of sites 220, a list of machines 230, and a list of exceptions 240 associated with the selected customer is populated on the interface 200.

Figure 2B:
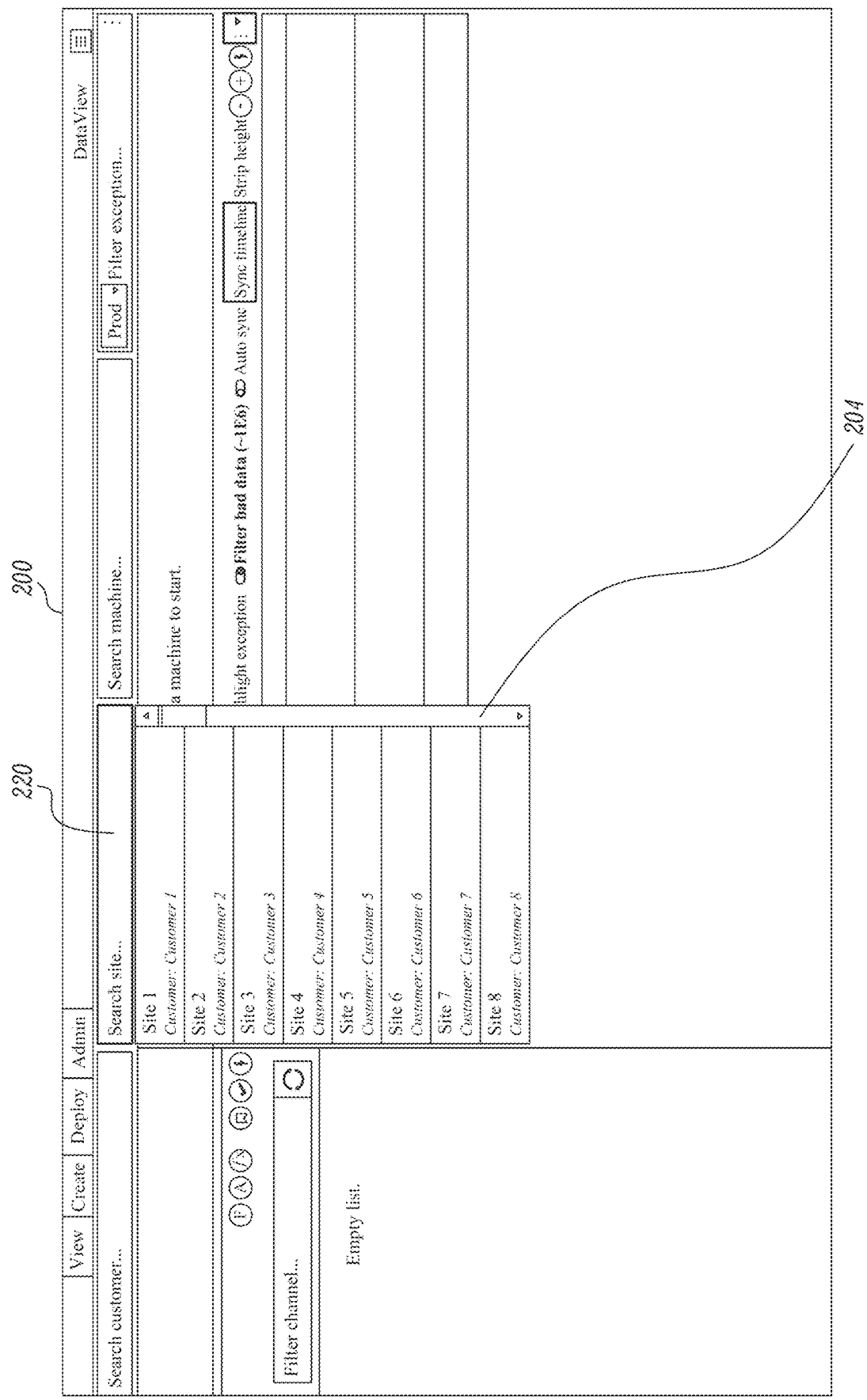

Now turning to FIG. 2B, illustrating interface 200, whereby User can conduct a search by filtering data by a site name. User can provide a site name either by entering a desired site name in a site name input area 220 or by selecting a site name from a drop-down list of site names 204. The interface 200 in FIG. 2B indicates, several site names, by way of example however not limited to, BMA peak down, Ravensworth, Glendell MARC.

Figure 2C:
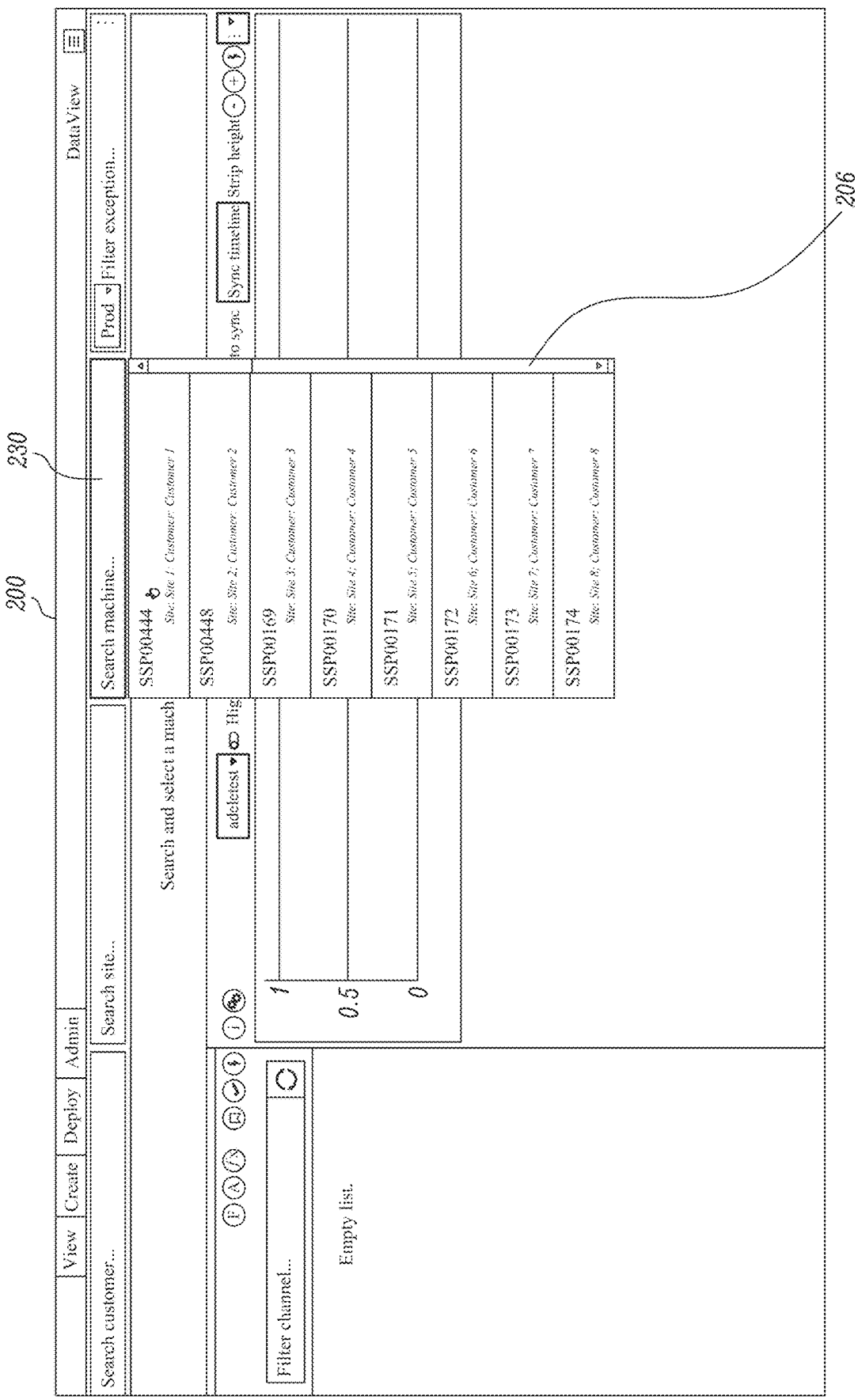

Alternatively, as shown in FIG. 2C, user can search data by filtering data by machine name on interface 200. A machine name can either be entered in a machine name input area 230 or by selecting a machine name from a drop-down list of machine names 206. As can be seen in FIG. 2C, the exemplary drop-down list of machine names 206 enumerates several machine names, by way of example however no limited to, SSP00448, SSP00169, SSP00170.

Figure 2D:
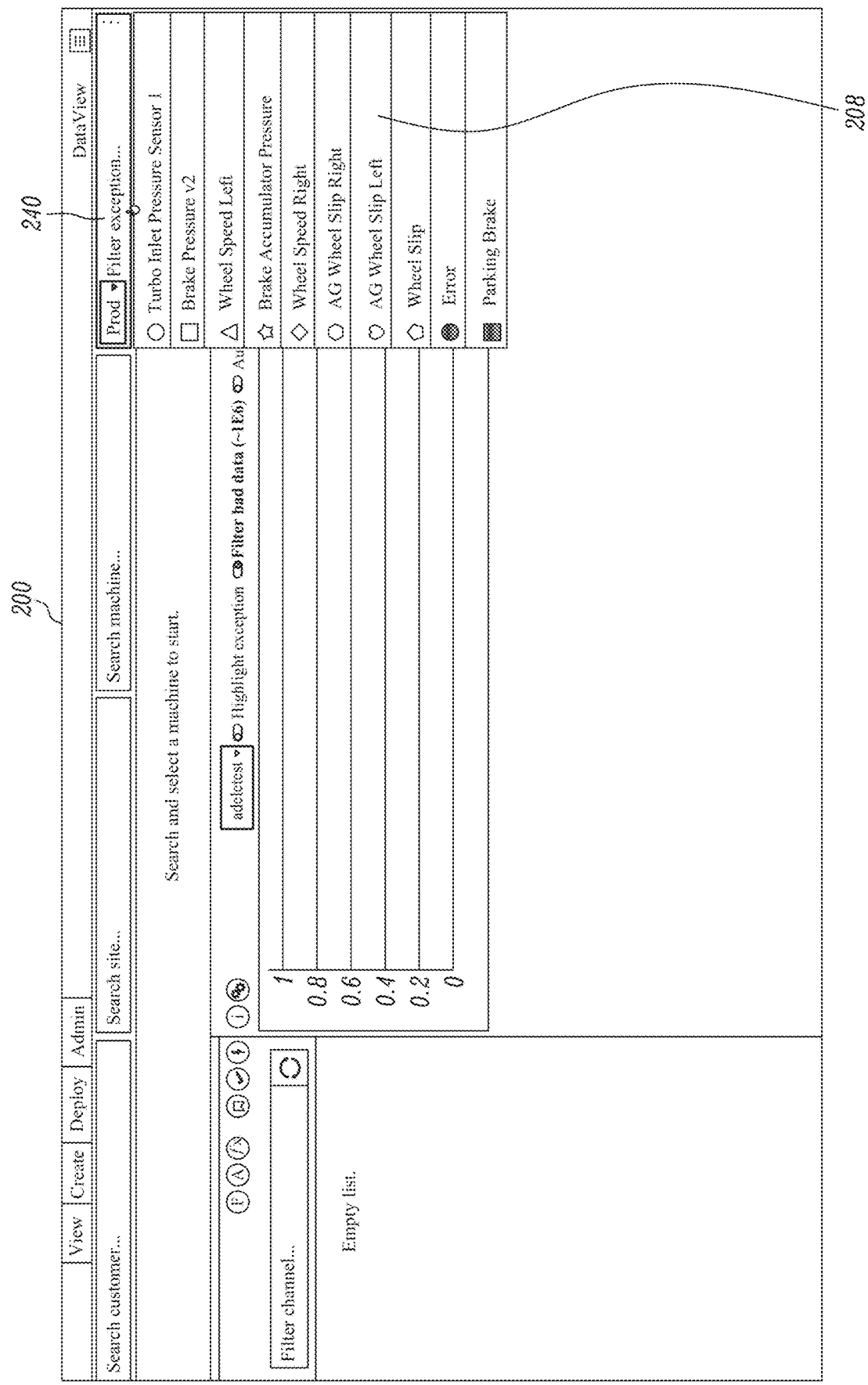

Similarly, User can filter data by exception name, as shown via interface 200 in FIG. 2D. User can provide an exception name by inputting a desired exception name in an exception input area 240 or by selecting an exception name from a drop-down list of exception names 208. Several exemplary names of exceptions are shown in the list of exception names 208, by way of example however not limited to, Brake pressure v2, Wheel Speed left, and Brake accumulator pressure.

Figure 3:
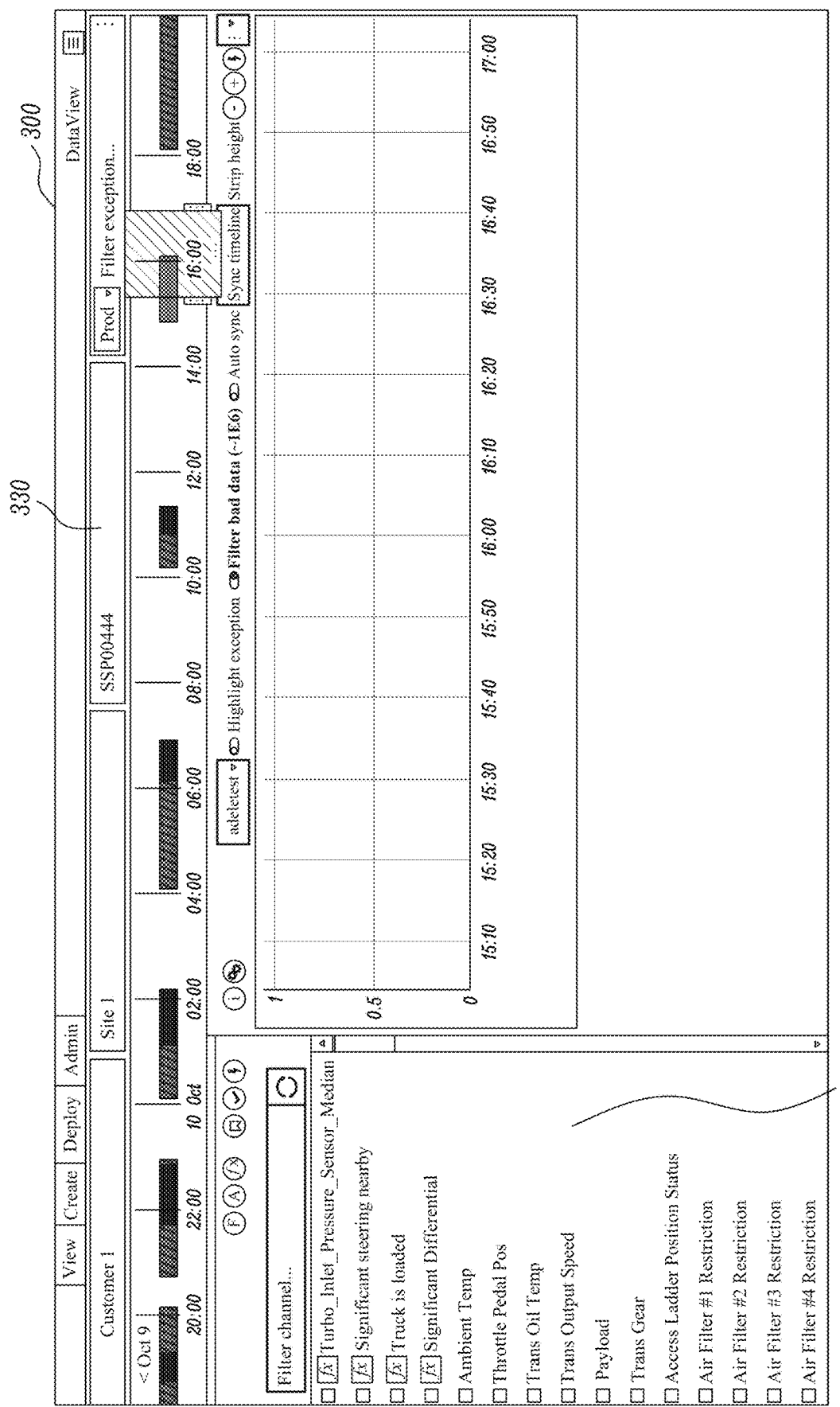
FIGS. 3-4 show an exemplary interface of filtering data of interest by selecting a machine and a specific channel of interest.
Figure 4:
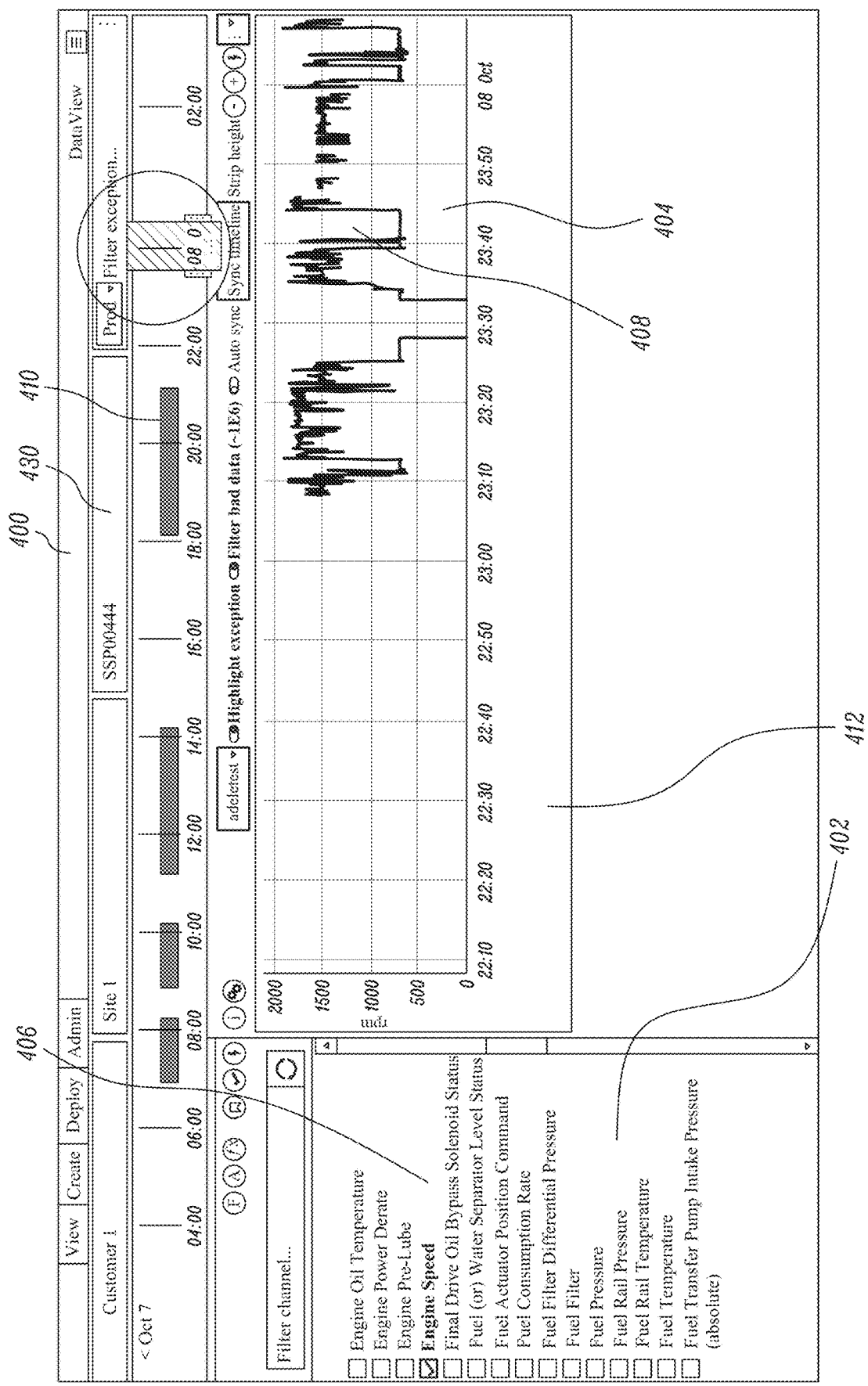

User may filter data of interest by selecting a machine and a specific channel of interest, as shown in FIGS. 3-4, however an exception is contemplated for an alert while channels are signals (time series data) coming from machines. User interface displaying content by overlaying exceptions on the top of time series data are provided and serve an important purpose for users to conduct validations.

Referring to FIG. 3, shown is interface 300 indicating selection of a machine 330 and selection of a channel 302 for selected machine 330 according to one embodiment of the disclosed invention. For example, in response to user selecting machine SSP000337 in the machine selection area 330, then a list of channels associated with the SSP000337 machine will be displayed in the channel selection area 302. In other words, time series data for SSP000337 regarding engine speed channel may be displayed on the interface 300 by selecting engine speed channel in the channel selection area 302.

According to one embodiment of the disclosed invention, in order to filter data from a desired channel for a desired machine, User can perform the following steps: (1) identify a machine of interest displayed in the machine selection area, (2) identify a channel of interest in the channel selection area, and (3) drag the selected channel onto the visualization area, (4) cause a visual display of data in the data visualization area for the selected machine from the selected channel. This phenomenon is displayed in FIG. 4. Referring to FIG. 4, interface 400 indicates an exemplary interface generated in response to User: (1) selecting machine "SSP000337" in a machine selection area 430 (2) selecting "Engine Speed" channel in a channel selection area 402, and (3) dragging the selected "Engine Speed" channel in the data visualization area 404 (4) causing a visual display 408 of data in the data visualization area 404 for SSP000337 machine from the "Engine Speed" channel.

As for the visual display 408, in the data visualization area 404, the x axis indicated by reference numeral 412 represents parameter xxx and y axis is indicated by reference numeral 406 and represents parameter yyy. After User drags selected channel in the data visualization area 404, data coming from the selected channel is graphically represented at the area indicated by the reference numeral 408 for the parameters selected on the x axis 412 indicating time and the y axis 406 representing a channel name such as engine speed measured in rotations per minute (rpm). User can zoom in, zoom out or change focus on a specific range of data via range selection tool 410.

Figure 5:
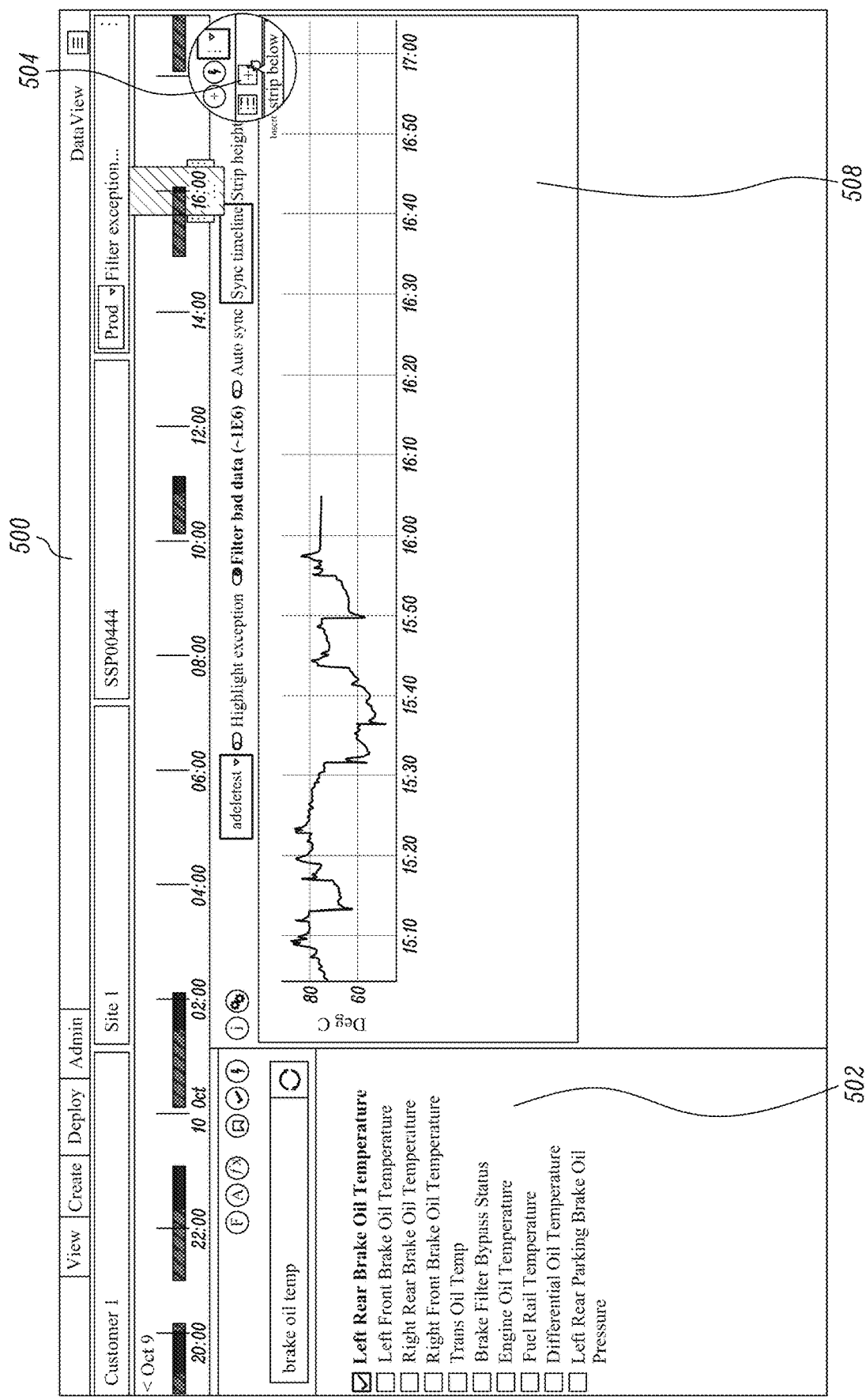
FIG. 5 illustrates add channel functionality according to one embodiment of the disclosed invention.

Now turning to interface 500 shown in FIG. 5, add channel functionality according to one embodiment of the disclosed invention is shown. Advantageously, if User is interested in viewing graphical representation of the comparison between data produced by a previously selected channel with data produced by additional/another (not yet selected) channel on interface 500, user can select add channel option 504. Upon selecting the add channel option, User can once again, select another channel of interest in the channel selection area 502, and drag the newly selected channel to an unoccupied section of the visualization area 508 to generate interface 600 shown in FIG. 6.

Figure 6:
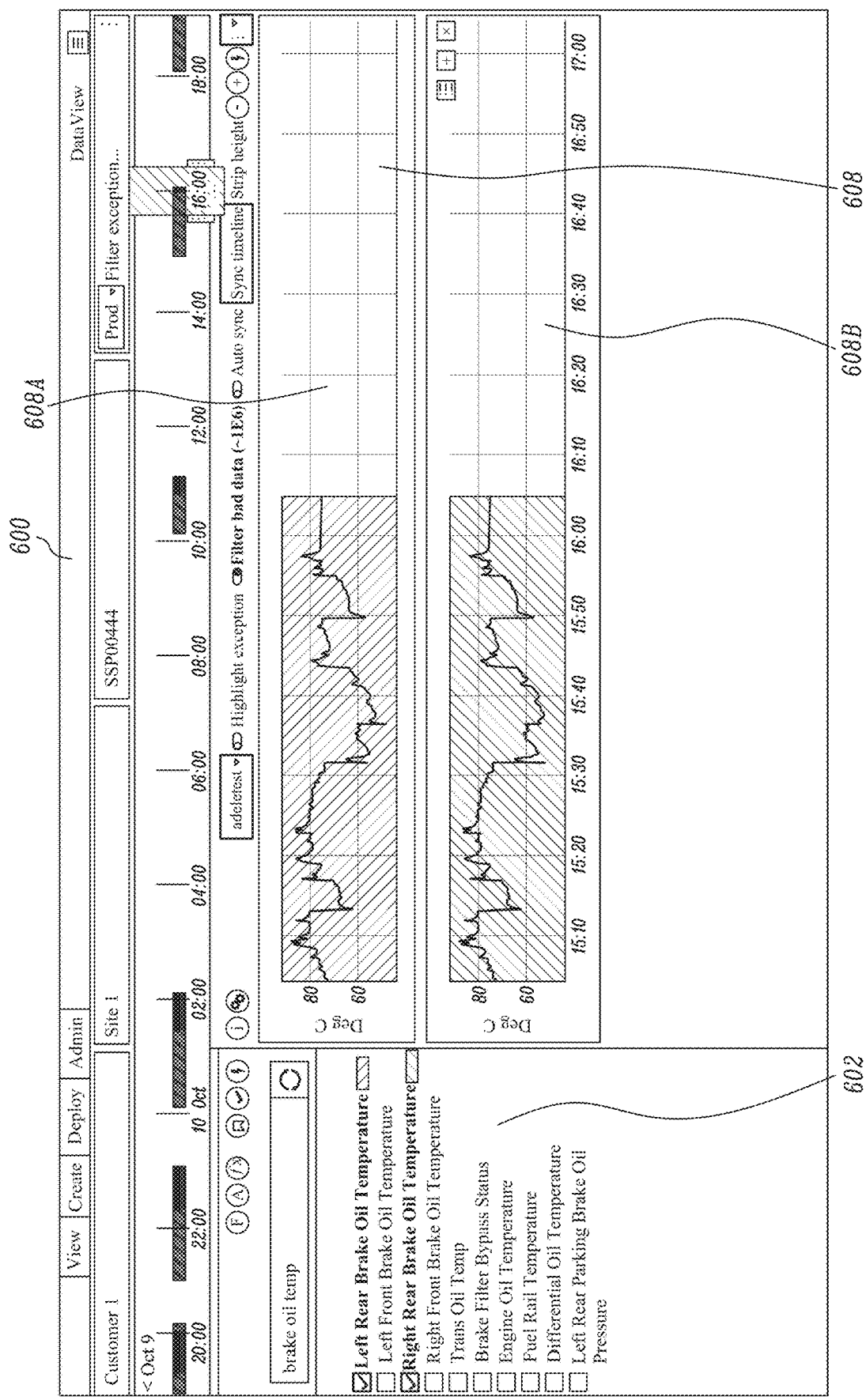
FIG. 6 shows an exemplary interface of data visualization for two data channels.

In FIG. 6, the exemplary interface 600 illustrates data visualization area 608 indicating a split display of data visualization. The first portion 608A of the data visualization area 608 contains data visualization representation for the previously selected "Left Rear Brake Oil Temperature" channel, while the second portion 608B of the data visualization area 608 contains data visualization representation for the newly selected "Right Rear Brake Oil Temperature" channel. It may be appreciated that User can easily adjust the visualization bar heights and by using the selector tool on the timeline, User can section off a chosen area of data.

Figure 7:
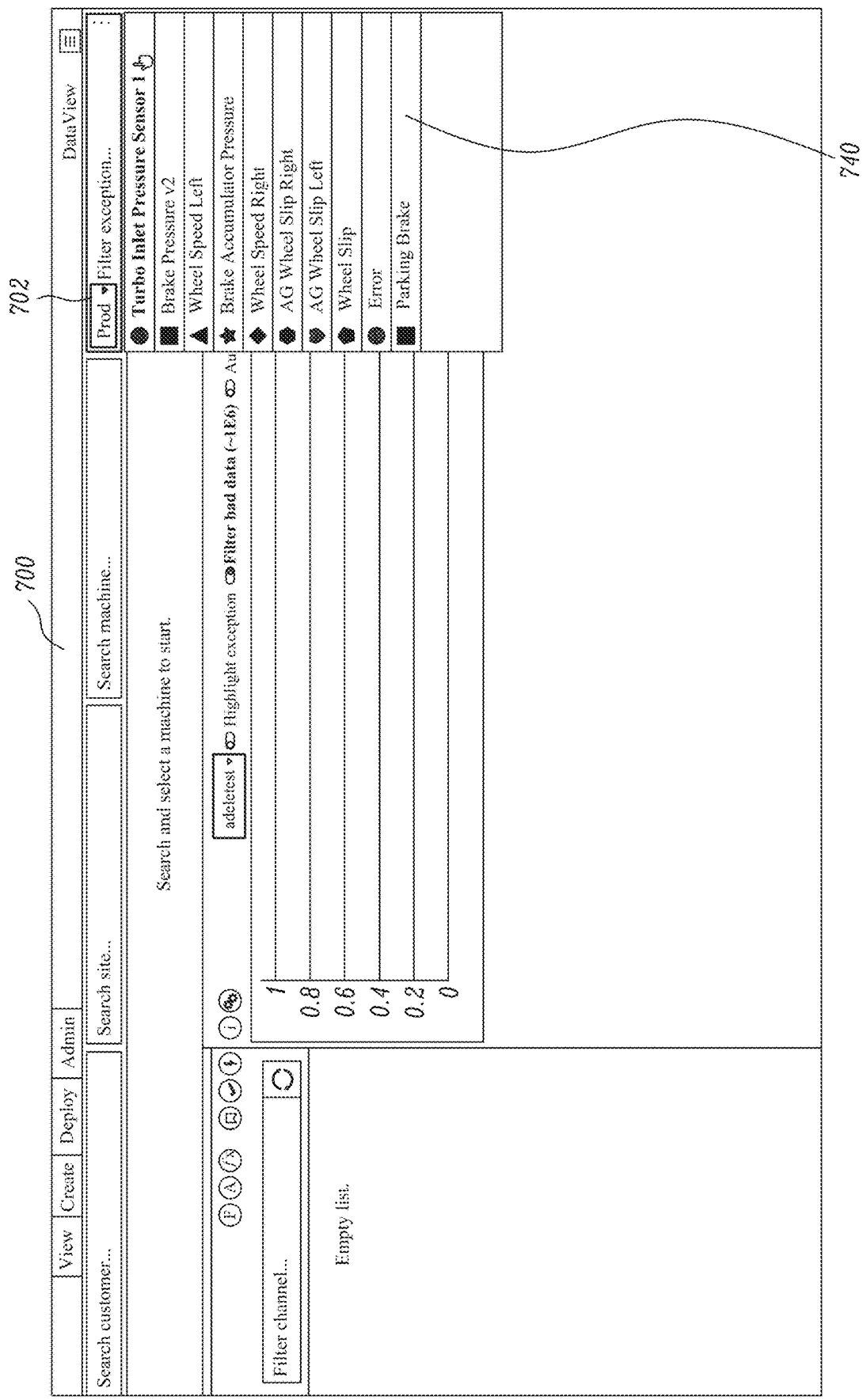
FIG. 7 depicts interface 700 whereby user can filter data of interest by selecting a specific exception according to one embodiment of the disclosed invention.

Alternatively, a User may be interested in filtering data of interest just by selecting a specific exception, in that case, User can select an exception of interest from a drop-down list of exceptions, at the exception selection area 740 on interface 700 shown in FIG. 7. After selecting the desired exception, User can select the exception handler tool 702 to generate an interface 800 shown in FIG. 8.

Figure 8:
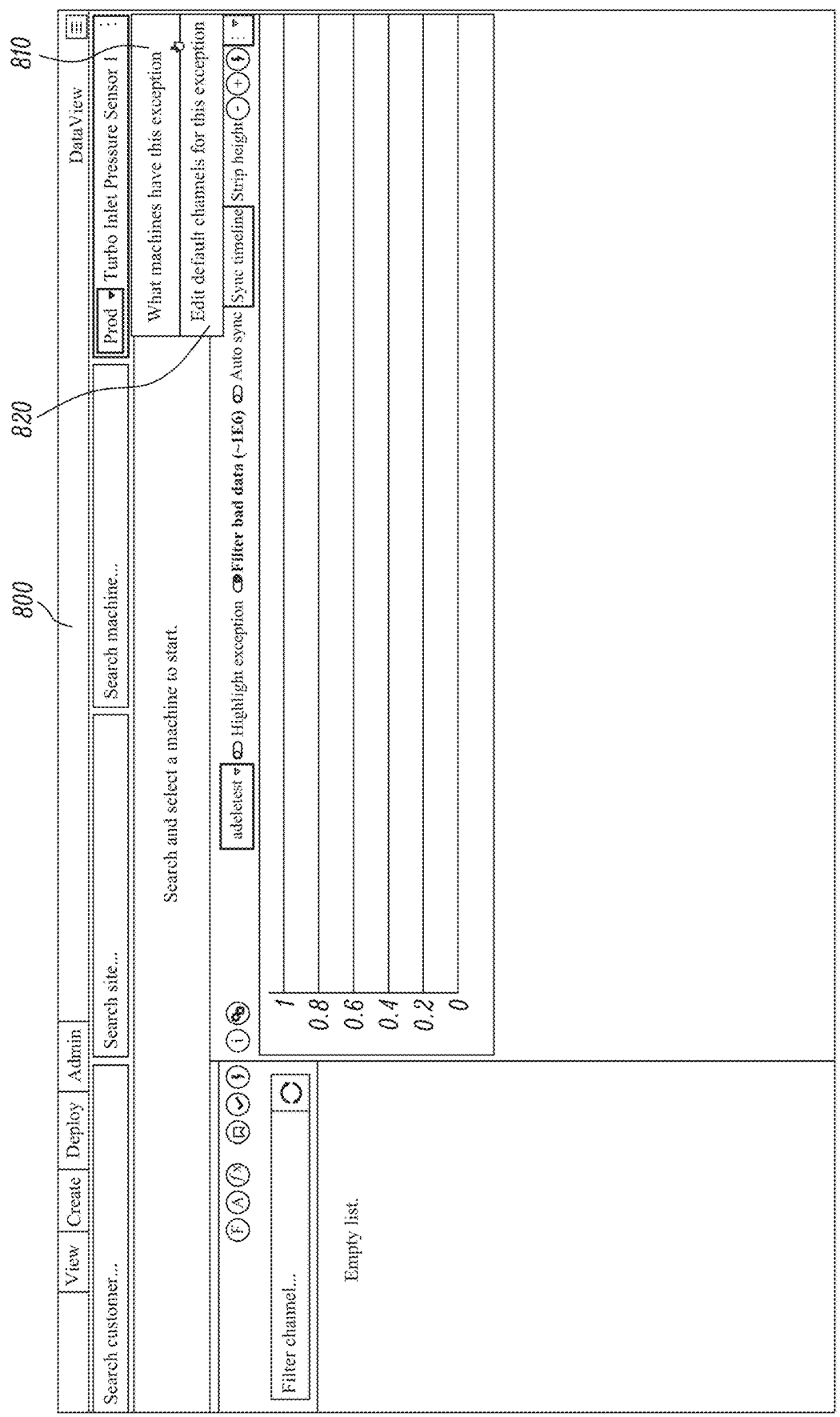
FIG. 8 indicates an exemplary interface 800 where user can view machines have the selected exception and edit default channels for the selected exception.

Now turning to FIG. 8, where two choices are presented for user on the interface 800. User selecting option 810 stating 'what machines have the exception', causes display of interface 900 shown in FIG. 9. Alternatively, by selecting option 820, User can change a list of default channels for the selected exception.

Figure 9:
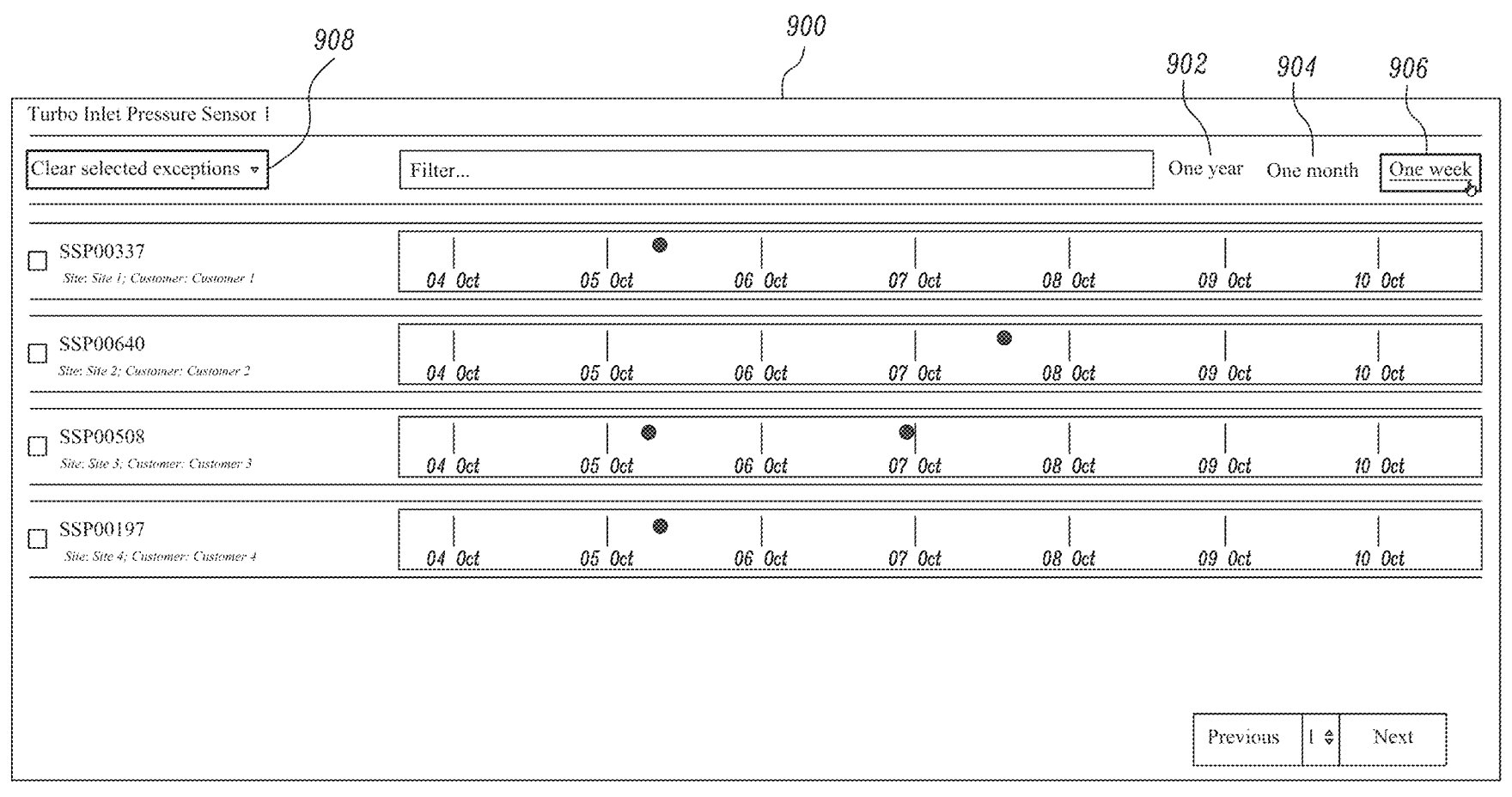

Referring now to FIG. 9, illustrating an interface 900 displaying a list of machines that have had the selected exception 908 in the past. User can filter the list of machines displayed on the interface 900 for a specific time span, for example User can select to view, for each machine in the list of machines, the date on which the machine had reported the exception in the past year, past month, and past week by selecting options 902, 904, and 906 respectively. This feature is helpful in identifying the precise time at which an alert was displayed, the duration for which the alert was displayed and the time at which a curative action was taken to resolve the issue that originally caused the alert display.

Alternatively, in another embodiment, however not shown in FIG. 9, User can also filter data by the frequency at which the selected exception has been reported by the machines. For example, User can select the list of machines to enumerate the machines that have reported the exception once a year, once a month, or once a week. This feature is advantageous because User has the ability to spot the machines that need immediate attention, such as, for instance the machines that have reported the exception once a week against the machines that do not need immediate attention, for instance the machines that have reported the exception once a year. The alerts or exceptions data becomes a "ground truth" once validated by CMAs. Ground truth is a labelled data, and may be defined as, data a data scientist must have before data scientist can train a supervised machine learning model. A large number of ground truth data will probably lead to generating a more accurate machine learning model.

The analytics iterations may be conducted during the model validation process to guard against "edge cases", and to produce optimum thresholds based on statistics and/or engineering experience and product/industry knowledge. An edge case may be defined as a case which is near the acceptable design limits that may be subject to User's selective elimination. At the beginning the analytics model may not use a precise formula to promptly detect occurrence of a specific failure, however, it may be iteratively fine-tuned by the members of the data scientist community and non-data scientist community.

This iterative method seeks to input from subject matter experts, such as members of the data scientist community to identify various use cases. In this context a use case, in its simplest form can be a list of associations, typically defining the interactions between an associated inference reflecting an equipment condition system to achieve a goal. In systems engineering, use cases may be used at a higher level than within software engineering, often representing missions or stakeholder goals. The detailed requirements may then be captured in the Systems Modeling Language (SysML) or as contractual statements.

Additionally, the iterative method, adjusts the algorithm of the analytics model based on feedback received from the non-data scientist community, wherein feedback comprises the results of those cases. Having data scientists working closely with subject matter experts will enable optimum alert criteria that works best for applicable assets and increase the throughput by users.

Figure 10:
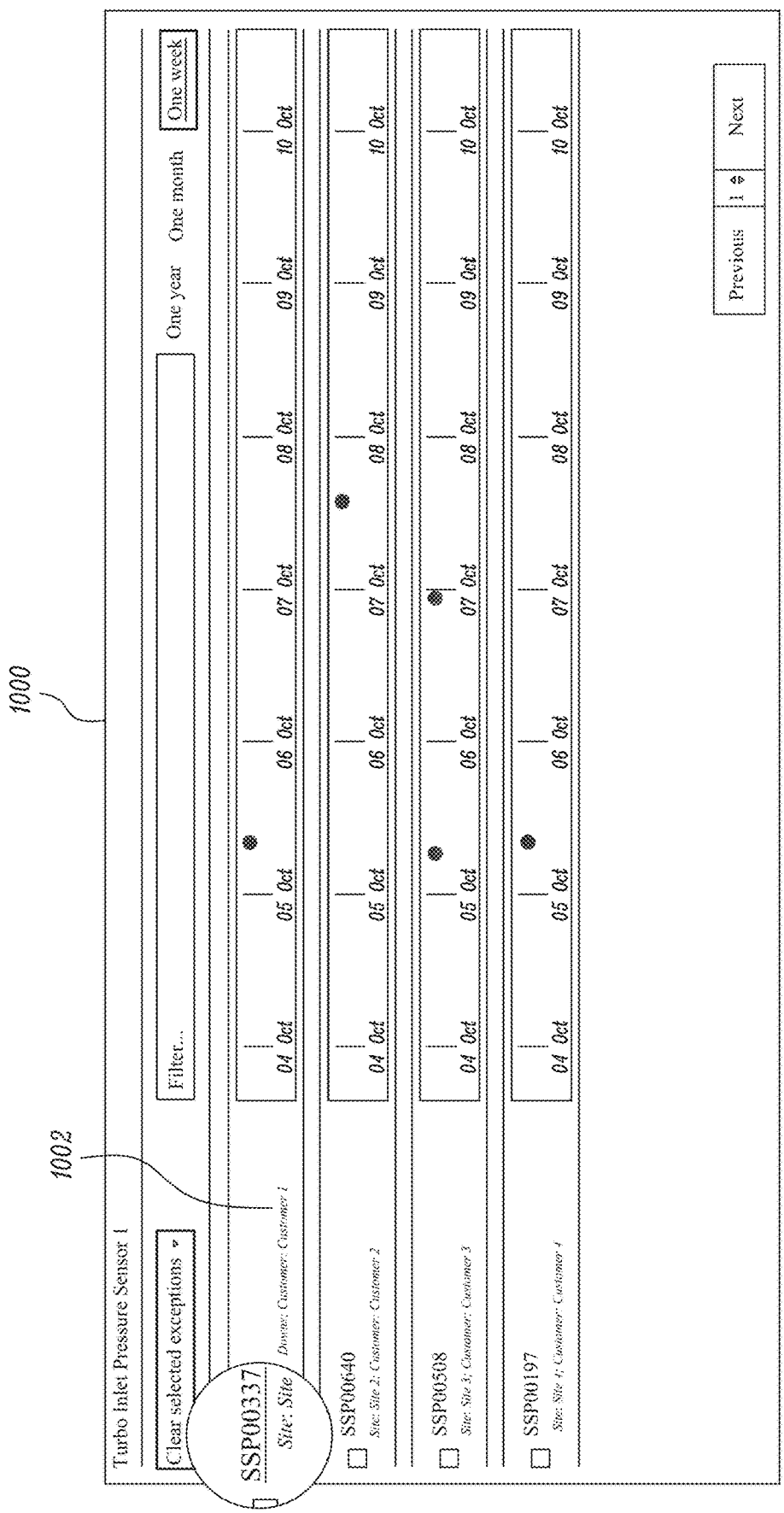
FIG. 10 illustrates manner in which user selects a machine from the list of machines who have reported the selected exception according to one embodiment of the disclosed invention.

It shall be appreciated that user can select a specific machine from the list of machines displayed on the interface 900, as shown in FIG. 10. Interface 1000 shows a list of machines reporting the selected exception, where user has selected machine "SSP00337" indicated by the reference numeral 1002.

Referring again to FIG. 10 shown is User selecting a machine from the list of machines who have reported the selected exception. Interface 1100 shown in FIG. 11 is displayed in response to user selecting machine 1002 on the interface 1000.

Figure 11:
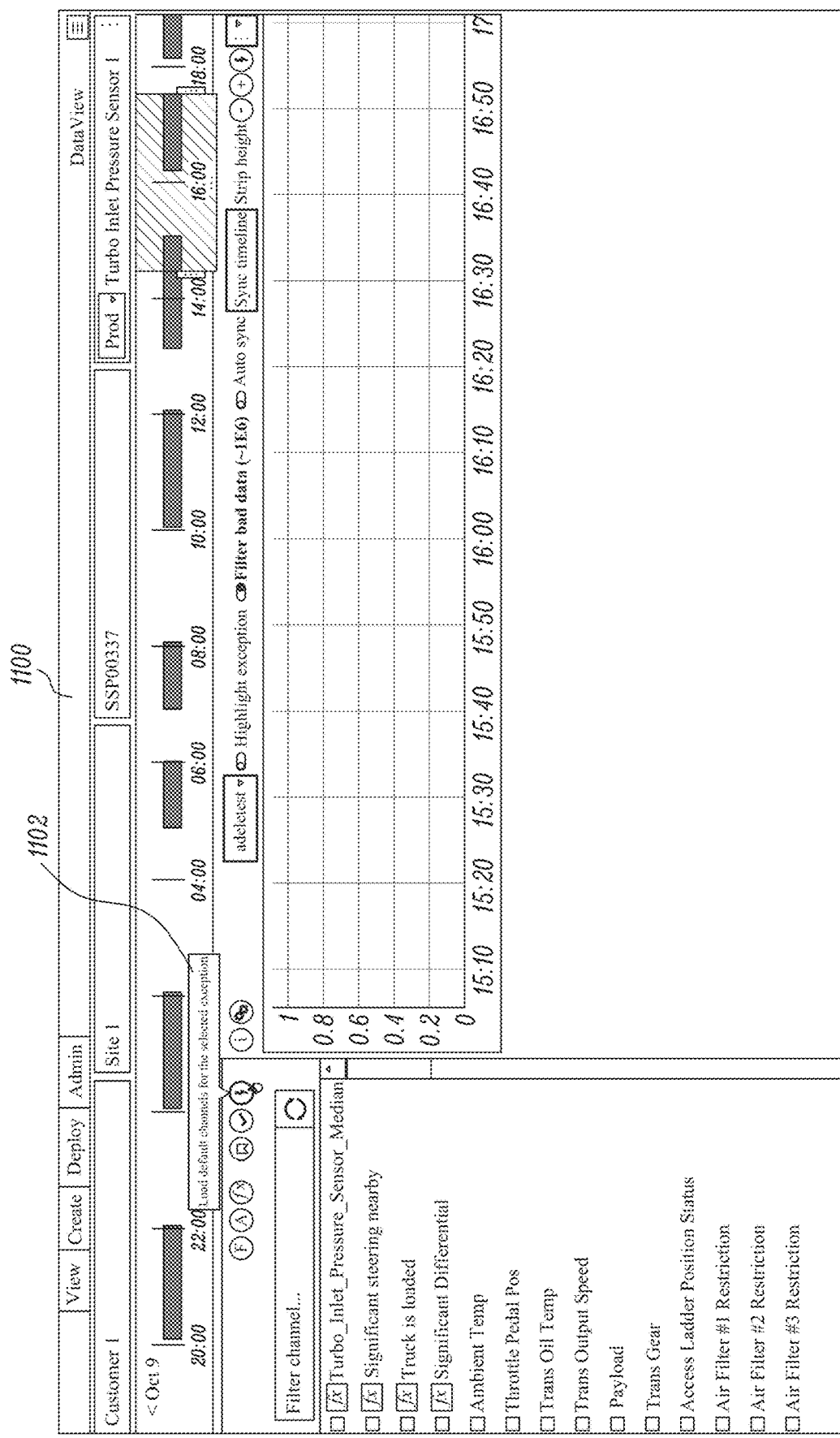
FIG. 11 indicates a load default channels option according to one embodiment of the disclosed invention.

Referring to FIG. 11, each exception has a filtered list of channels associated with it and, by selecting load default channels option 1102 on interface 1100, User is able to view the default channel list for the selected exception as shown in FIG. 1200.

Figure 12:
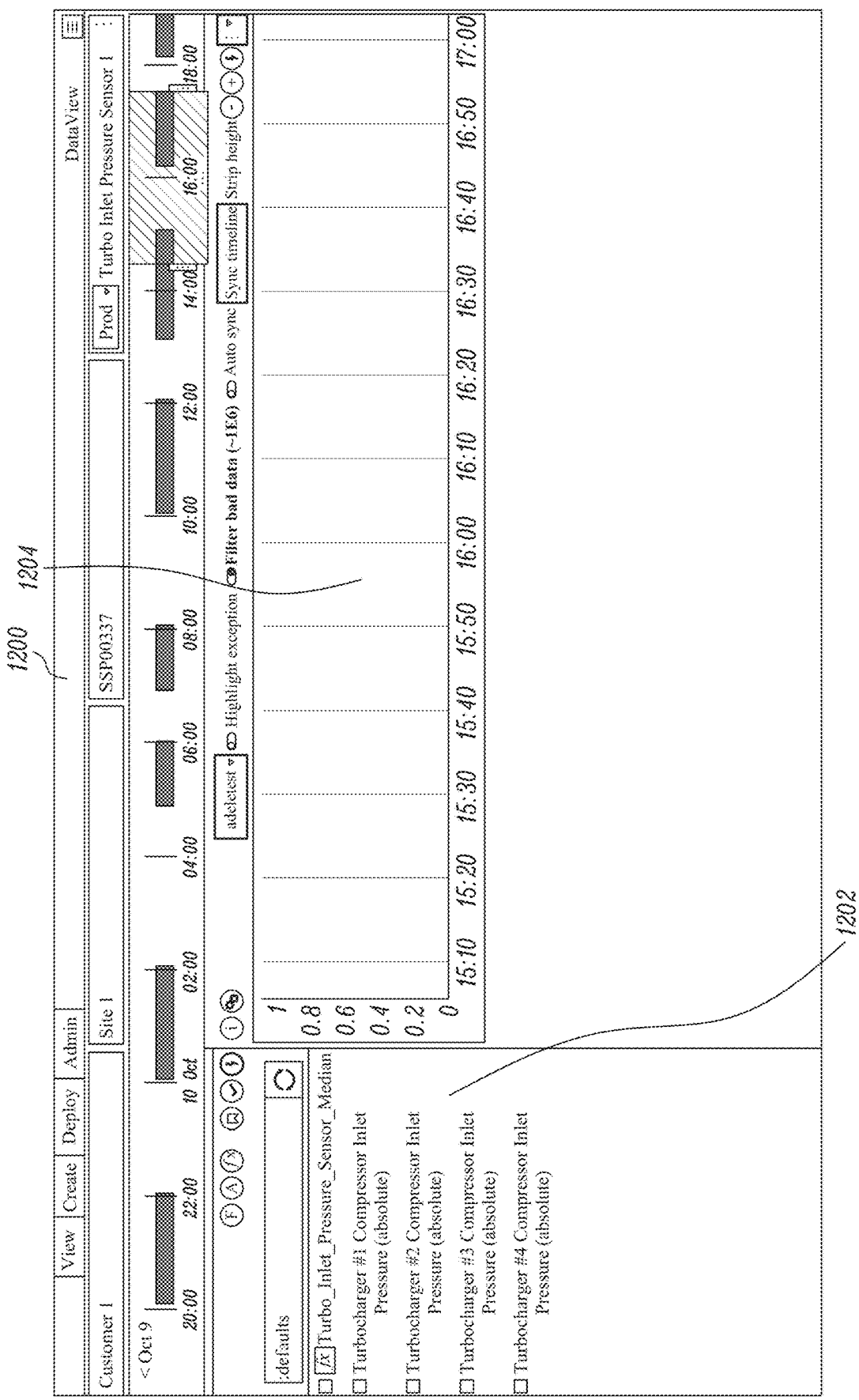
FIG. 12 displays an example of a default channel list for the selected exception.
Figure 13:
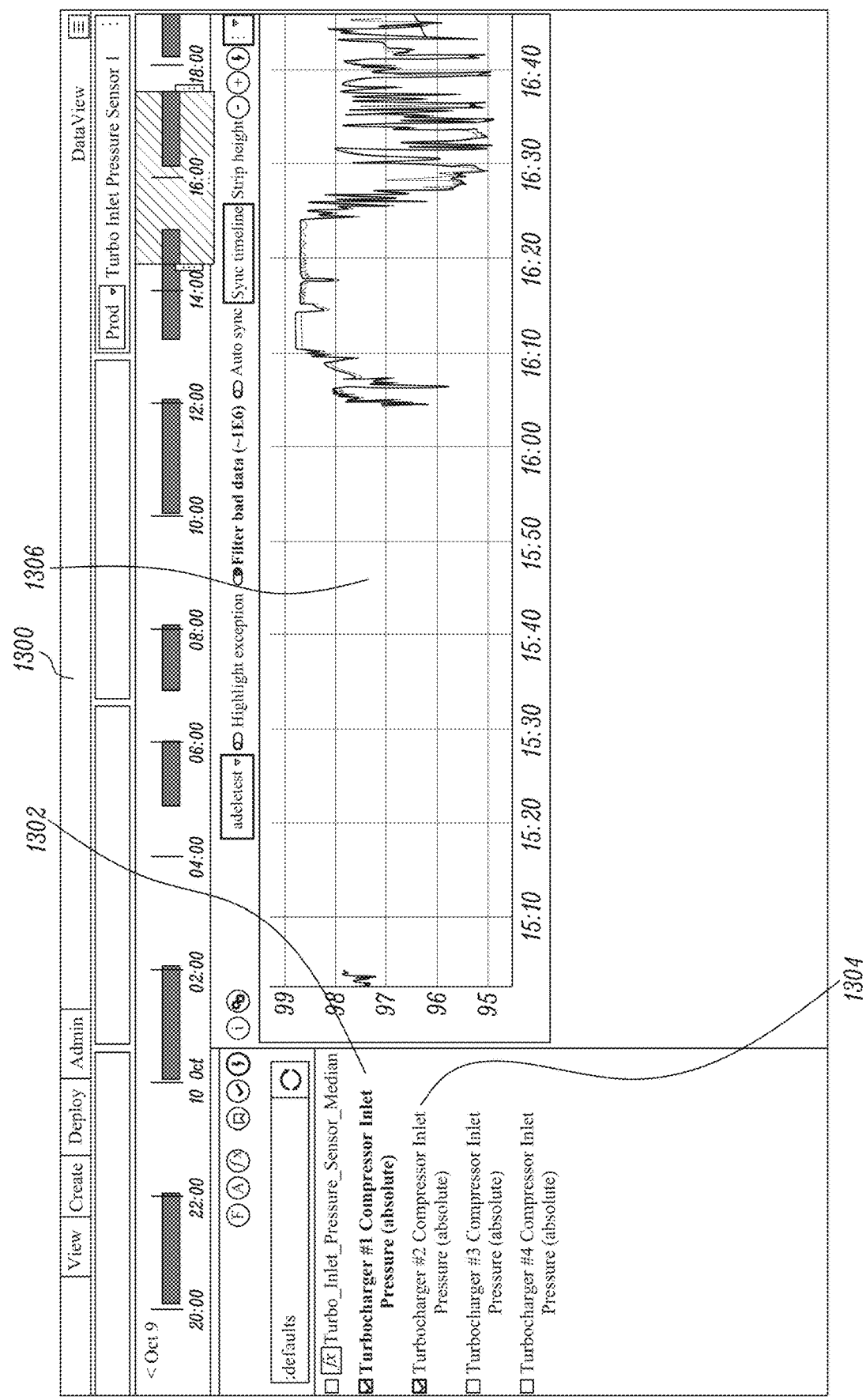
FIG. 13 shows an exemplary visual representation of the selected data channels.

Referring to FIG. 12 now, interface 1200 displays the default channel list for the selected exception and, User can, from the list of default channels 1202, drag and drop data channels of interest onto the visualization area 1204 to generate visual representation of the selected data channels as shown in interface 1300 in FIG. 13.

Now referring to FIG. 13, showing interface 1300 where after selecting two channels indicated by reference numerals 1302 and 1304, User has dragged the selected channels 1302 and 1304 onto a data visualization area 1306 to generate data visualization representation 1308. Additionally, a timeline 1310 is shown on interface 1300, showing that User can view exceptions identified for the selected machine as being represented by icons on the timeline 1310. The dateline 1310 is shown in further detail on interface 1400 in FIG. 14.

Figure 14:
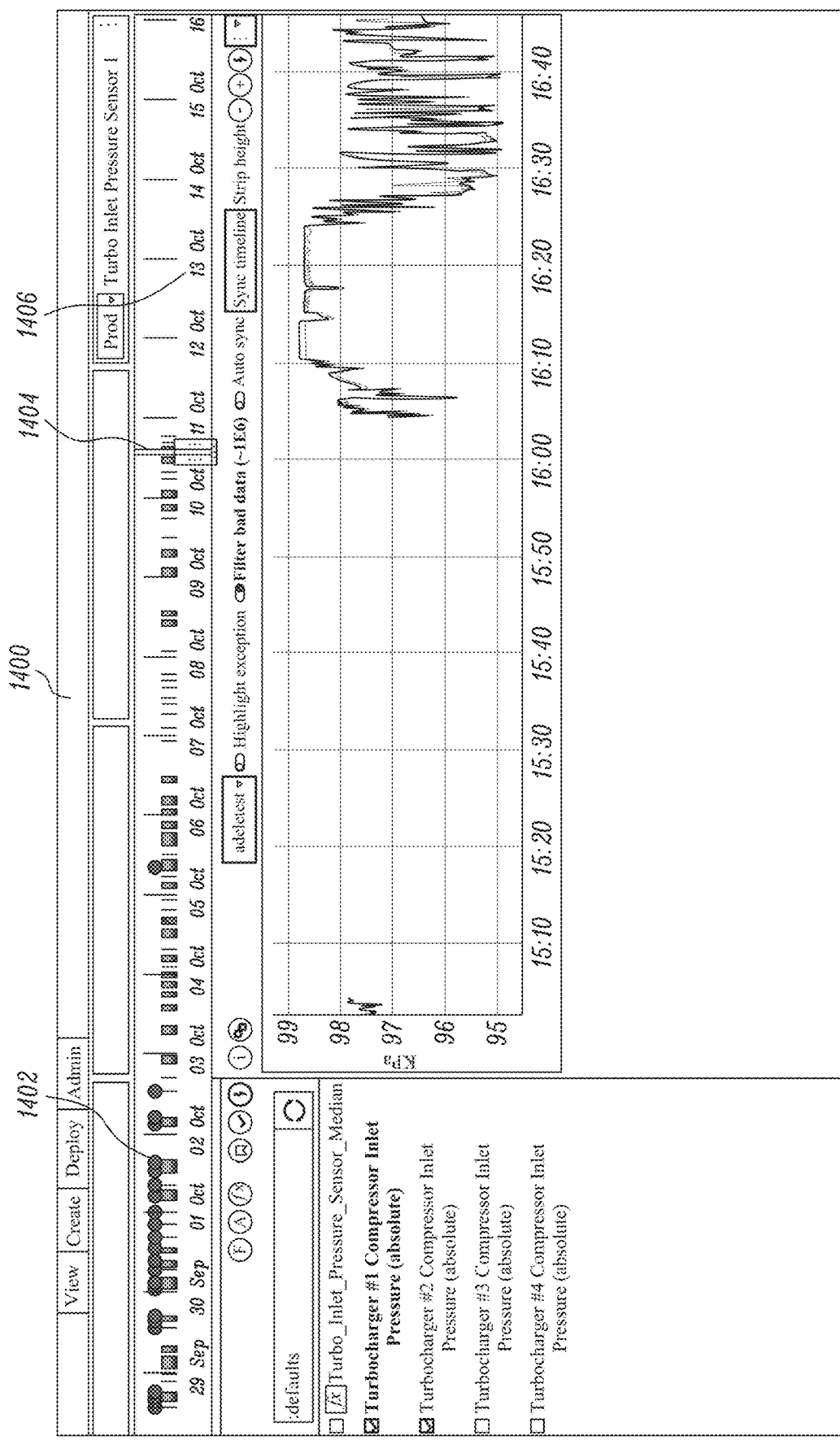
FIG. 14 indicates exceptions on a timeline according to one embodiment of the disclosed invention.

FIG. 14 depicts exceptions on a timeline according to one embodiment of the disclosed invention. User may, by scrolling out to the left and right direction on the timeline 1408, see exceptions identified by exception icons 1402. Thus, timeline 1408 visually represents exception icons 1402 along with the corresponding date 1406 when the exception occurred as shown in FIG. 4. User may select an exception icon 1402, causing the selector tool 1404 to quickly focus and indicate on interface 1400. The selector tool 1404 displays data during the time span just before and after the time when the exception indicated by the exception icon 1402 had occurred. This event is shown in FIG. 15.

Figure 15:
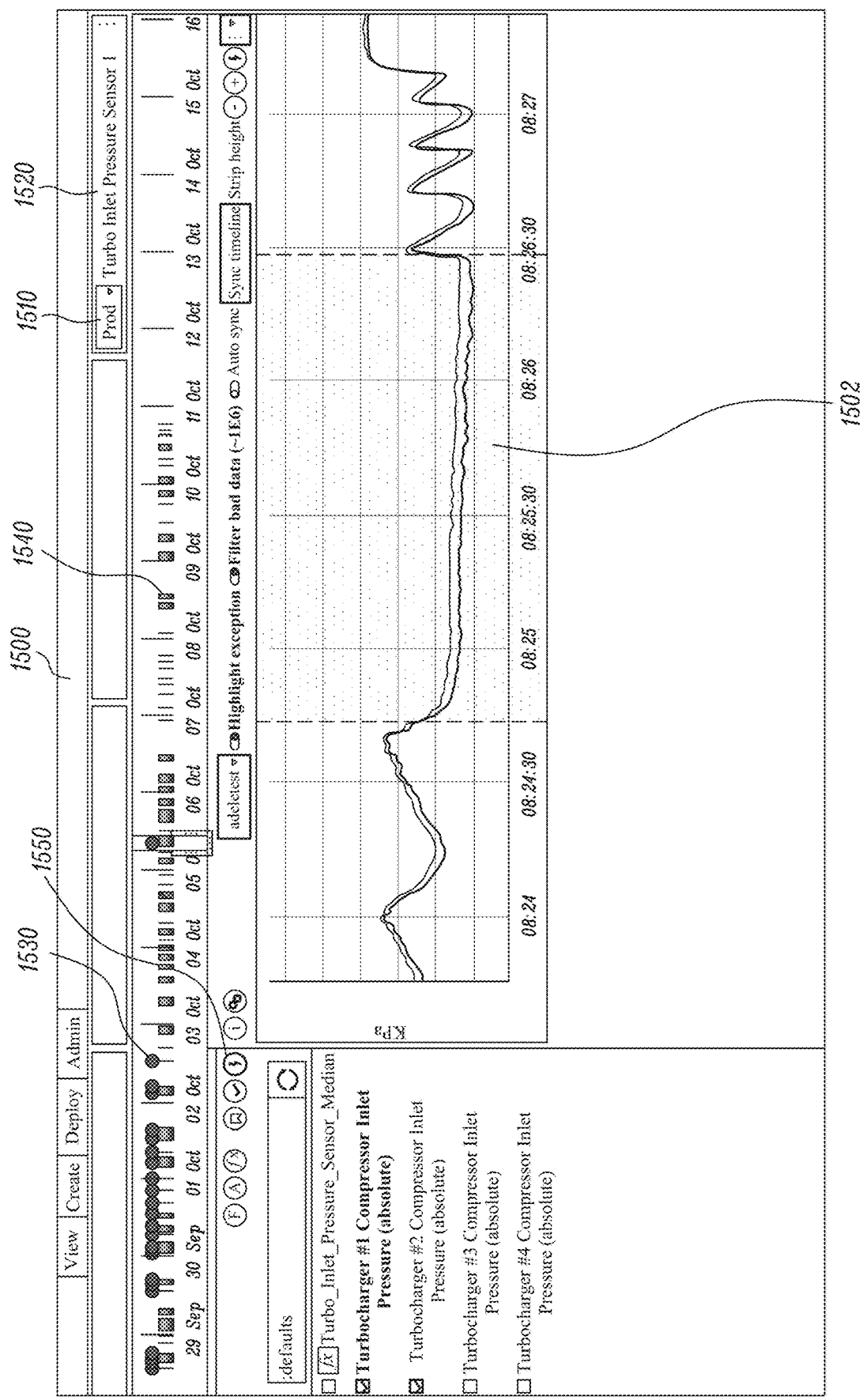
FIG. 15 depicts exceptions on a timeline according to one embodiment of the disclosed invention.

FIG. 15 depicts exceptions on a timeline according to one embodiment of the disclosed invention. Turning now to FIG. 15, interface 1500 shows data visualization on October $5^{th}$, from 8.24.30 to 8.26.30. This visualization can be used to identify data trend in that specific time span indicated by reference numeral 1502. The ability of the disclosed system to not only visualize data but to narrow that data to specific exceptions can especially useful in debugging causes of an unusual machine behavior.

Furthermore, User can provide feedback on a specific exception by labelling a given exception as good or bad or an even exception. The exception can be characterized as a good exception when the exception provides an alert of an event that is important for a user. Conversely, an exception can be categorized as a bad exception when it provides an alert of an event that is not important to the user. Additionally, User can add comments reflecting why certain exception is good or bad, and even provide steps that are to be taken in order to improve the bad exceptions.

Once a user selects a machine and/or an exception before selecting channel/s to visualize data of interest, the combination of these parameters define a view. In this case, on interface 1500, user may choose a particular asset 1510, followed by particular failure model 1520 on the top right dropdown menu, User can then choose a particular exception 1530 from macro time line view 1540 on which several green dots are displayed. Each green dot represents an instance when an exception was reported. As for channels, the user can either choose the channels used for this failure model by clicking lightening button 1550 or user created view template. Optionally, user can add additional channels depending upon the user's needs. The needs of customer often change from time to time and from application to application. However, for same applications, user is likely to repeatedly generate the same view to access same/similar information by creating, saving and subsequently accessing the saved view.

Figure 16:
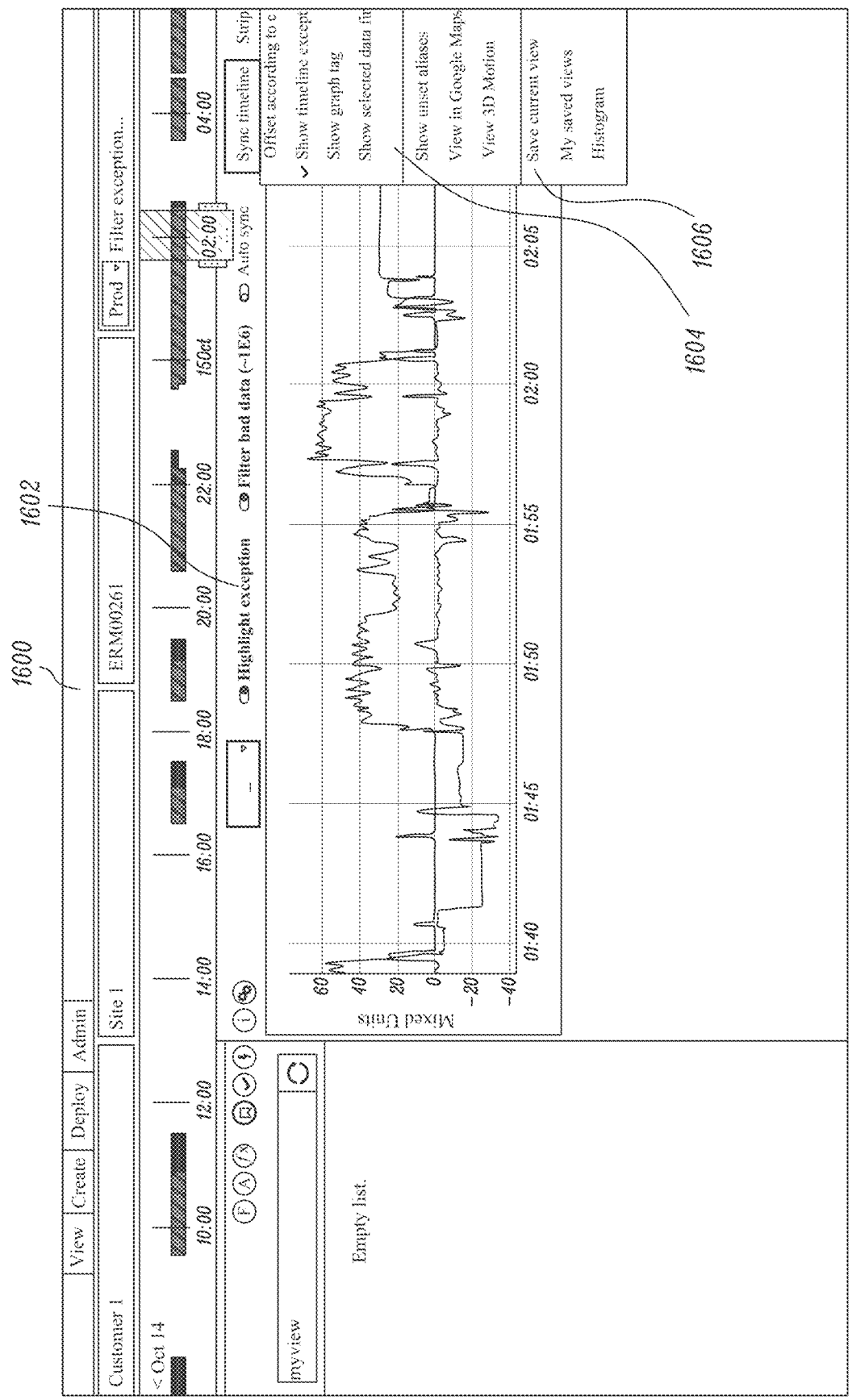
FIG. 16 shows various data visualization options for the user according to one embodiment of the disclosed invention.

Referring to FIG. 16 shown is various data visualization options for the user according to one embodiment of the disclosed invention. To save user efforts in having to create same view over and over, the disclosed system offers several functionalities such as, save current view, my saved views, Histogram and the like, via interface 1600 of FIG. 16. User may select option 1602 to highlight the given exception.

By selecting "save current view" option 1606 from the drop down menu 1604. In other words, user can save the newly created current view, as shown on interface 1600, for future use via interface 1700 shown in FIG. 17. User may select, via various options from the drop down menu 1604, having the ability to perform other operations such as show graphics tag, show selected data files, view data in google maps and view in 3D motion.

Figure 17:
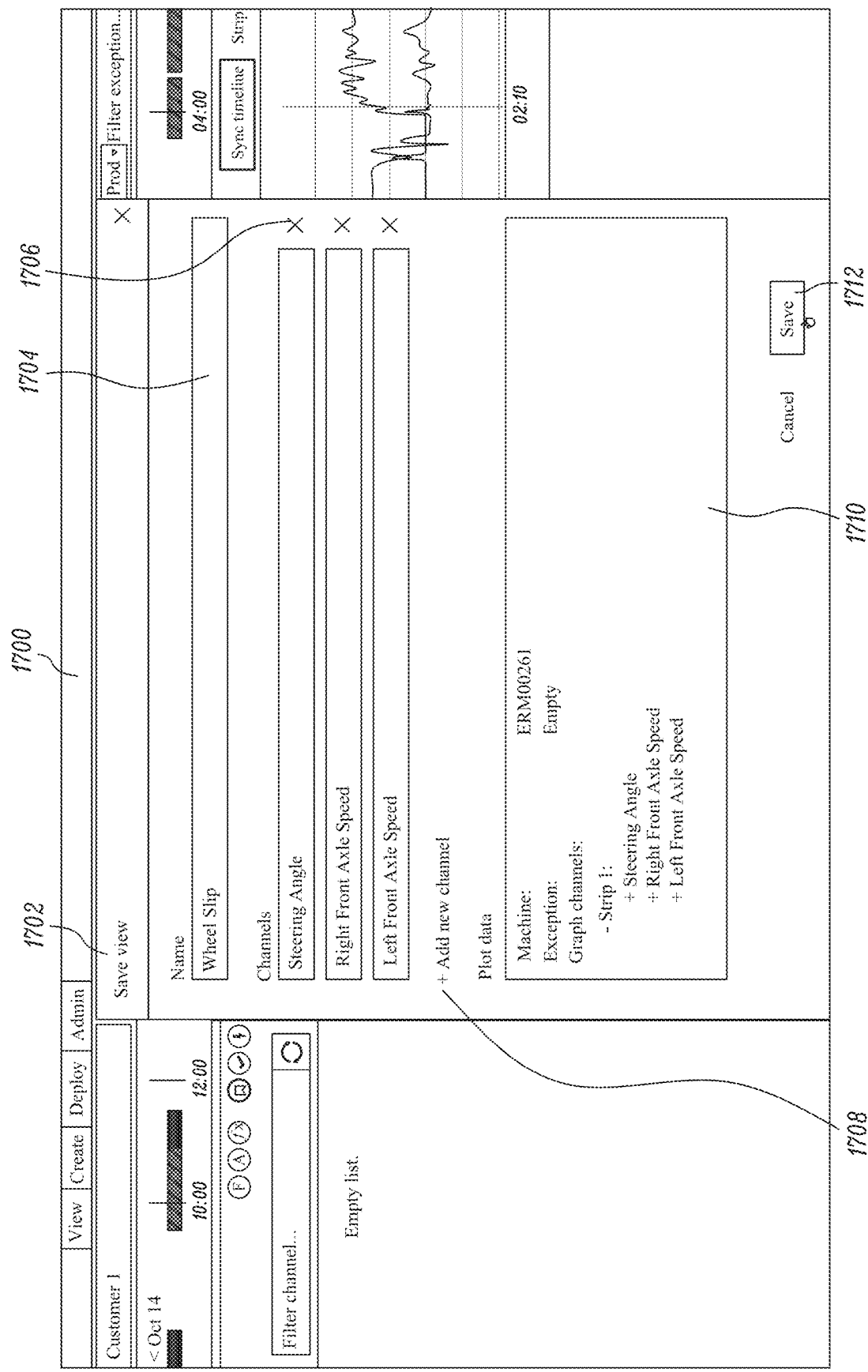
FIG. 17 indicates an exemplary save view option in response to a user selecting save current view option.

Turning now to FIG. 17, a save view window 1702 on interface 1700 is generated by user selecting save current view option 1606 on interface 1600. User provides a name by which the view is to be saved in the view name input area 1704. list of selected channels is populated on the window 1702, thereafter user can delete any of the listed channels by selecting option 1706. Similarly, user can add new desired channel by selecting add new channel option 1708.

The code for the view being saved is displayed in code display area 1710. User is, as described in greater detail below, able to fine tune the view parameters via changing code in the code display area 1710. After providing the desired view name, desired channels and desired code modifications, user can select save option 1712 to save the newly created or newly modified view for subsequent use. Notably, unless user wants to create a brand new view, typically, user is interested in making small but significant changes to the code, based on the custom needs of user application/s. It shall be appreciated that User is not required to know computer languages such as Python, R, SAS, SQL, and the like in order to make the code changes.

Figure 18:
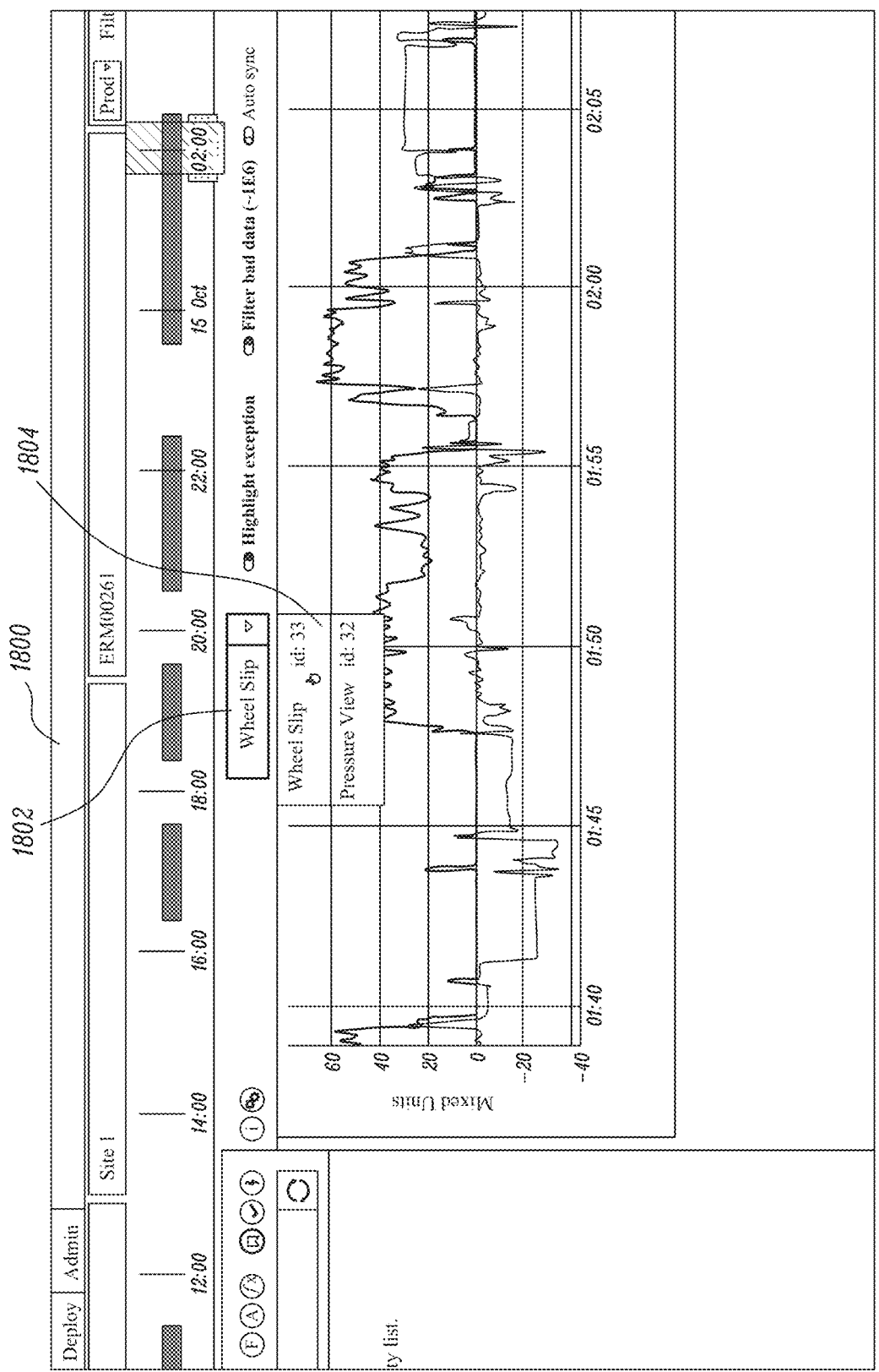
FIG. 18 illustrates a manner in which user can switch to a previously saved view according to one embodiment of the disclosed invention.

Alternatively, as shown in FIG. 18, user can switch to a previously saved view by selecting interface 1800, a display saved view option 1802. Now referring to FIG. 18, using previously saved view 1802, user can select to view one of the previously saved views. A drop-down list 1804 of all the previously selected views is displayed in response to user selecting option 1802. User can select one option from the view. When one of the options from the drop-down list of previously saved views 1804 is selected, then the details pertaining to the selected view are displayed for the user, This process is shown in FIG. 19.

Figure 19:
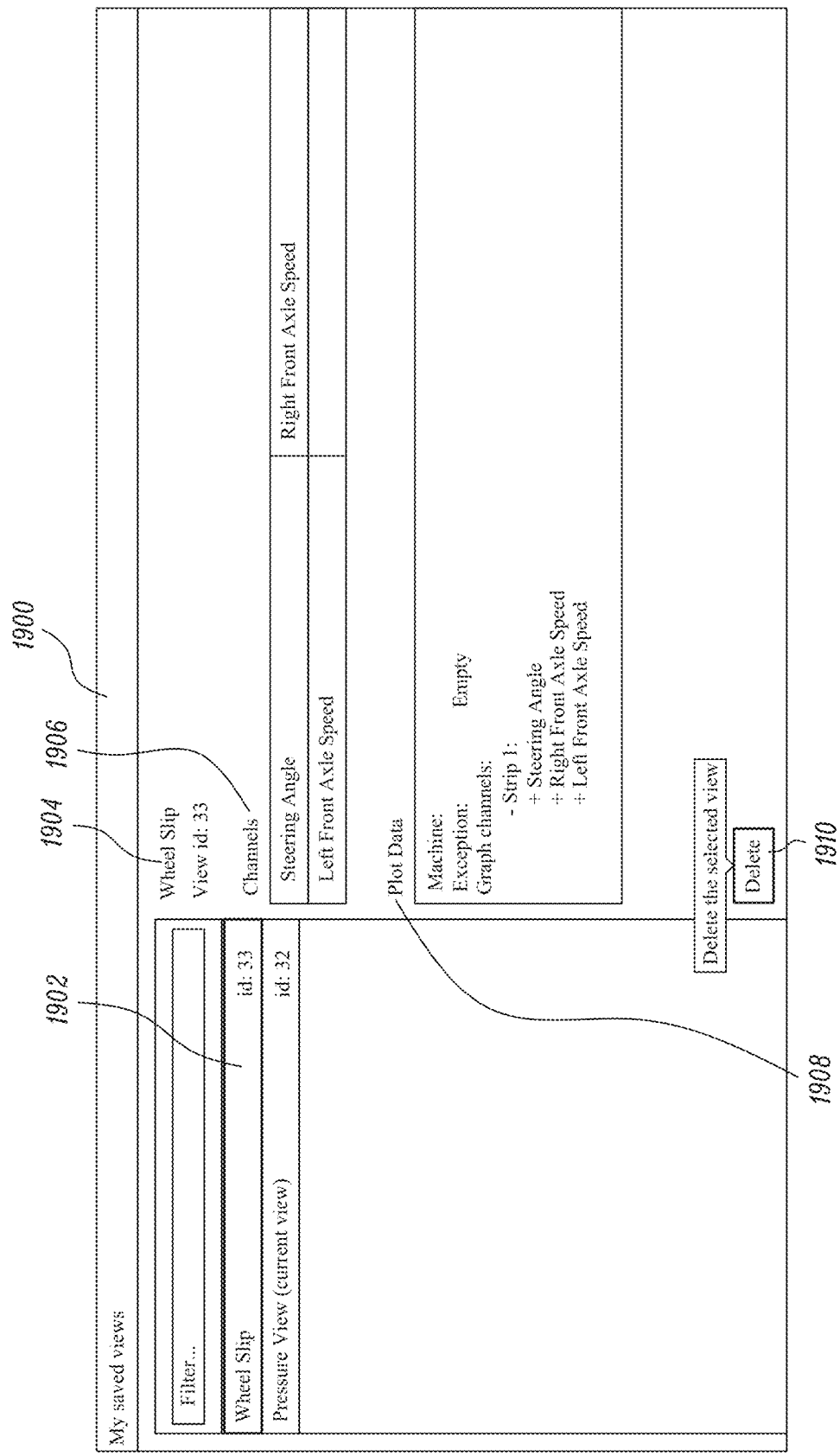
FIG. 19 shows various attributes of previously saved views according to one embodiment of the disclosed invention.

Referring FIG. 19, attributes of user's previously saved views as explained. Interface 1900 displays a view selection area 1902 showing views that have been previously saved by the user. Upon user selecting a specific view from the views listed in the view selection area 1902, various attributes pertaining to the selected and previously saved view are displayed on the interface 1900 such as a view name 1904, a list of channels 1906 that have been selected for the saved view, and the software code 1908 for the saved view. User can select a delete option 1910 to delete the saved view or select option 1912 to load the selected view. This feature is particularly valuable because this is a personalized or customized view template where user can save a new view and modify an existing view. This view can be readily uploaded by user by selecting this view from the drop down list of views instead of user repeatedly having to create this view from scratch.

Figure 20:
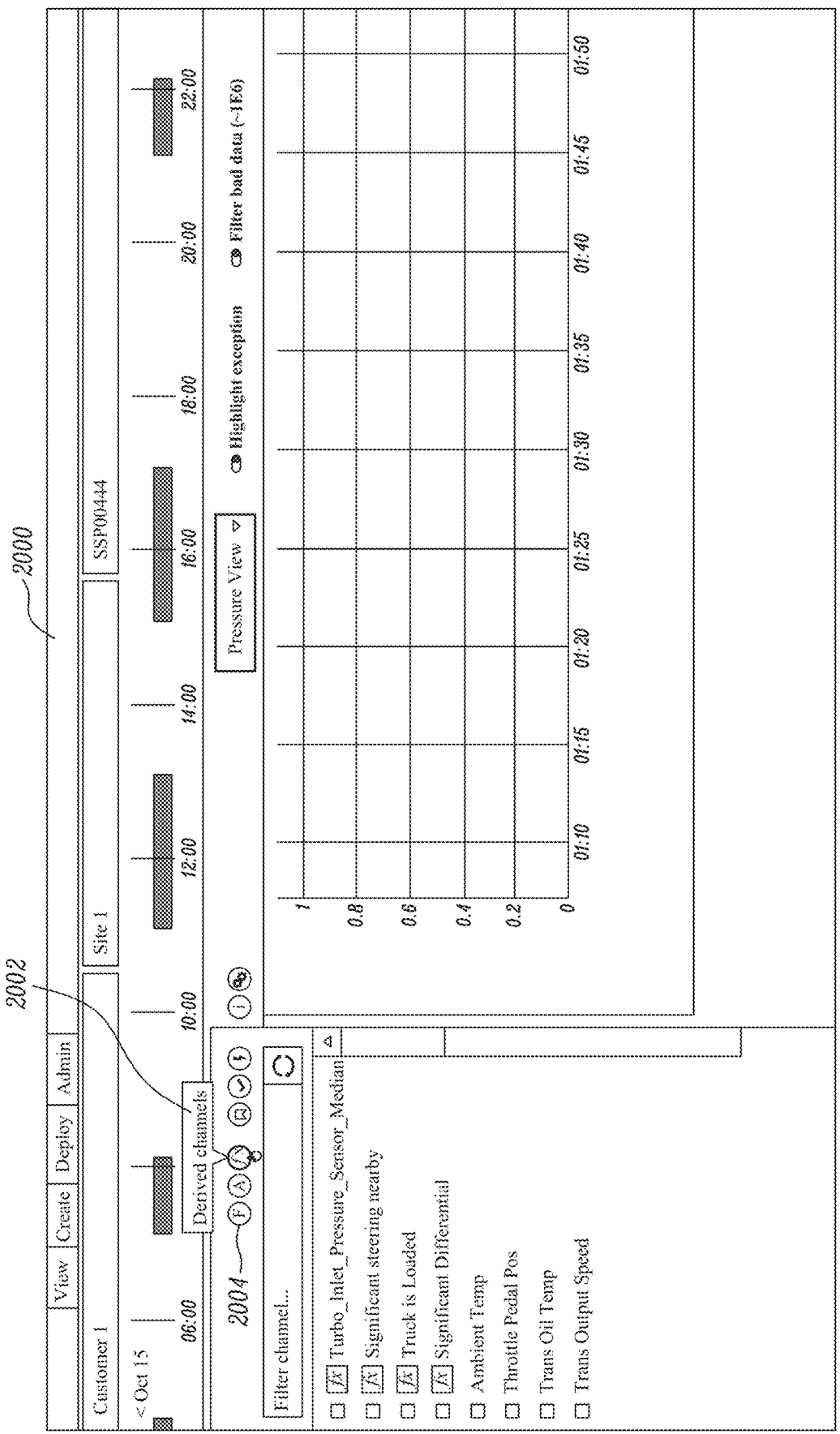
FIG. 20 illustrates an exemplary interface for creating derived channels.

User's ability to create derived channels is illustrated in FIG. 20. Derived channel is a calculation or dataset using a raw channels from the original dataset, that is created by a user that can be reused by the same user or others in same or different applications. In response to user selecting derived channels option 2002 on interface 2000 a display of interface 2100 is initiated. Additionally, user can select create fleet option 2004 to generate an interface discussed below in conjunction with FIG. 24.

Figure 21:
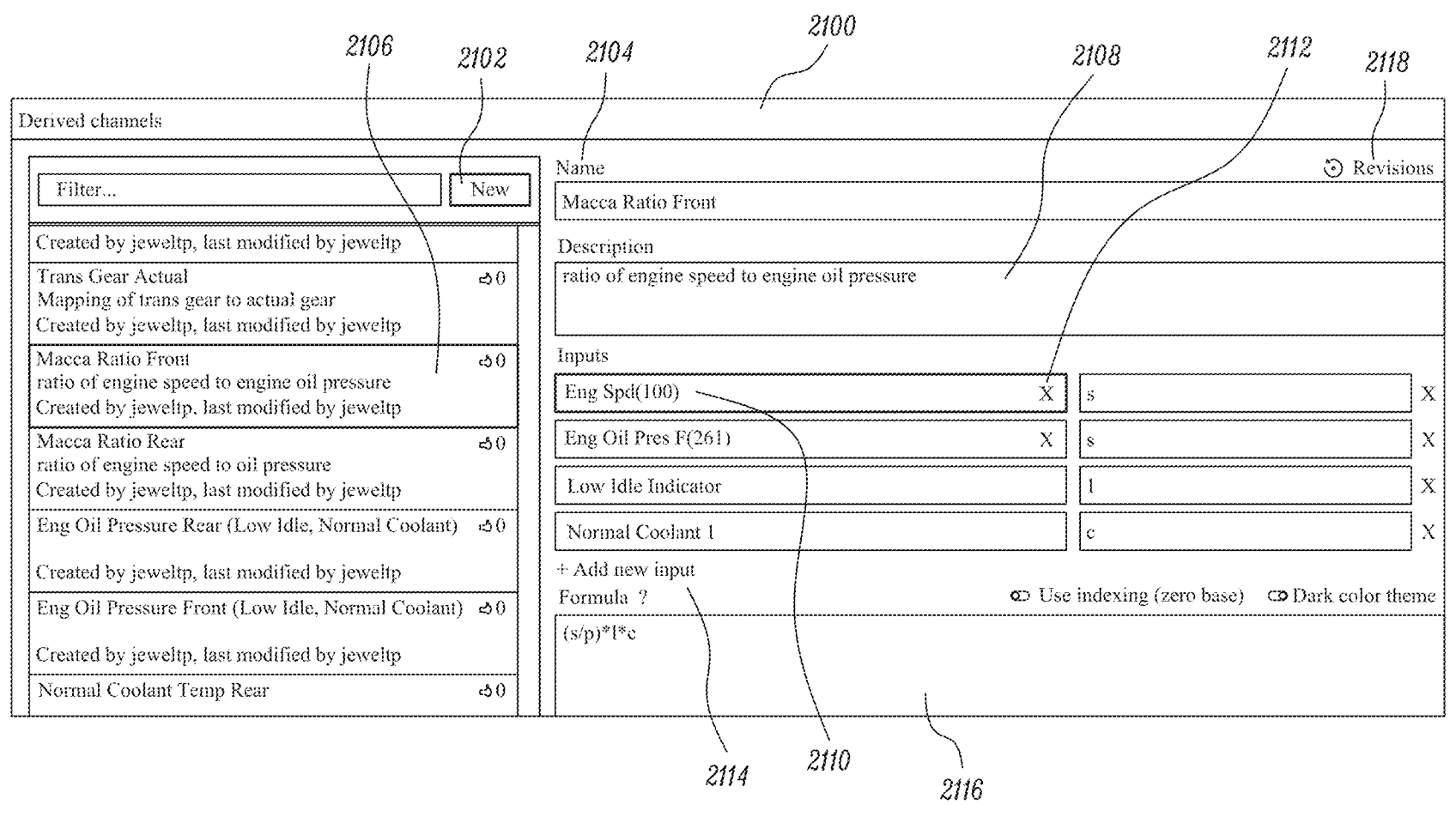

Now turning to FIG. 21 whereby user can create, edit, save or publish derived channels, a list of existing channels 2106 is displayed on interface 2100. When user selects a specific channel, a set of channel attributes are displayed on interface 2100, including but not limited to channel name 2104, channel description 2108, channel inputs 2110, and a delete input option 2112. This allows a User to delete a specific input, add new input option 2114, and formula input area 2116. By modifying the code in the formula input area 2116, user can create a new derived channel.

User can then save the newly created derived channel by naming such channel a first name. Similarly, user can publish the derived channel. Prior to publishing, the newly created derived channel can be modified, for example, by further modifying the algorithm/formula, and can be saved again under the first name. However, if user desires to modify a published derived channel, user can modify the published derived channel and save the revised derived channel by a second name, wherein the first name is different from the second name. In other words, a revised derived channel is a new revision of an existing derived channel.

By selecting view revision history option 2118, from any selected derived channel, user may view changes that were made, view who made them, but user can abort the update if necessary, and rollback to a previous version. It would be appreciated that if user desires to create a new derived channel, then user can select 'new' option 2102 and provide the aforementioned set of channel attributes such as channel name, description, input, and formula.

Figure 22:
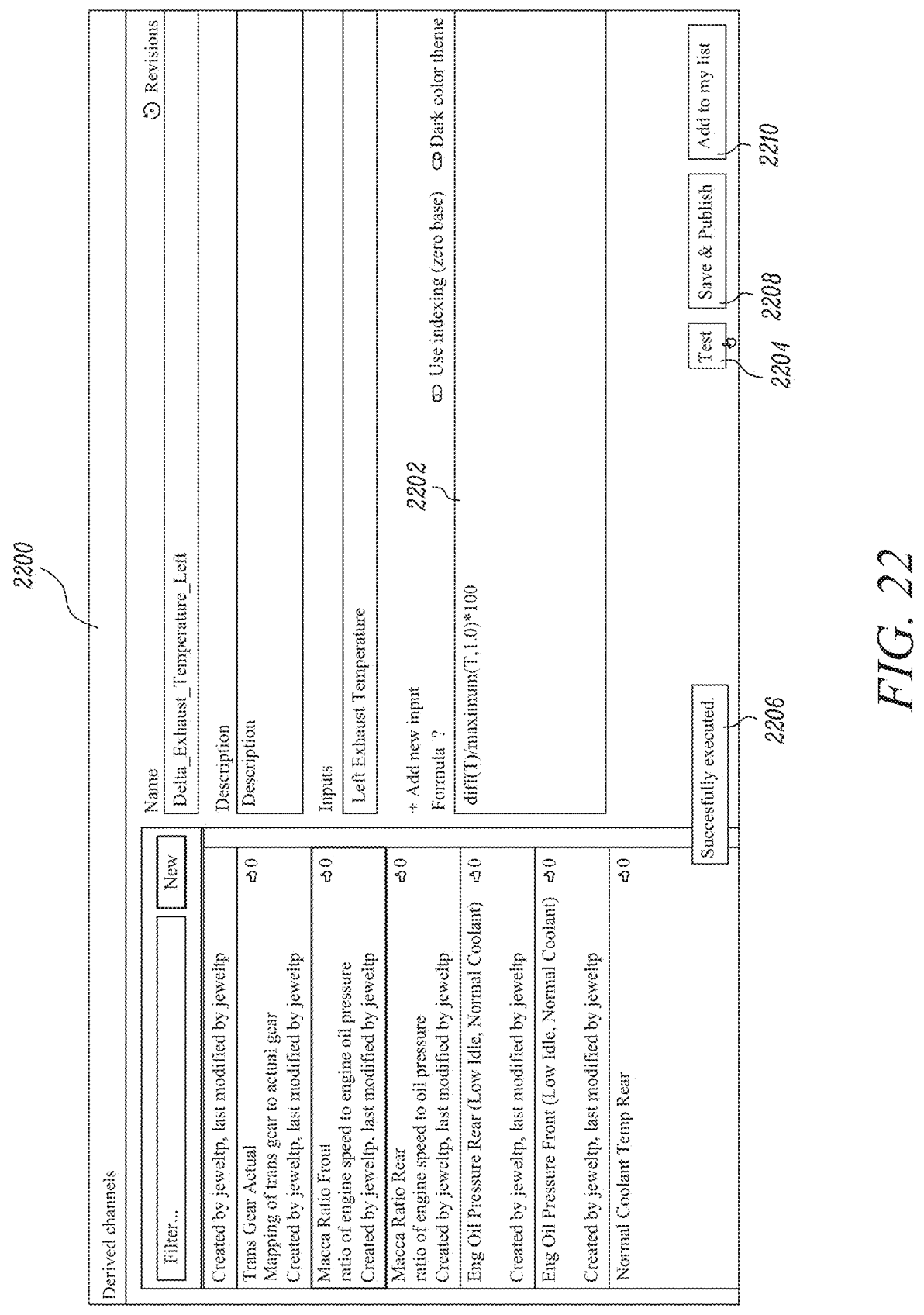

Referring to FIG. 22, shown is an exemplary interface 2200 where after entering formula 2202, user may test the entered code by selecting test option 2204. It shall be appreciated that user does not need to know any specific programming language syntax in order to modify or provide the formula to modify a derived channel or to generate a new derived channel.

After coding a new algorithm, via test option 2204, user can test to the newly written derived channel on specific machines. After successfully testing the newly derived channel, a successful execution notification 2206 is displayed on interface 2200. After successfully testing the derived channel, user can save the newly written algorithm for his or her personal use by selecting add to my list option 2210.

Alternatively, user can save and publish the algorithm by selecting save and publish option 2208 to instantaneously add the newly derived channel to user's channel list. If the newly derived channel is saved as a private channel, then the newly derived channel is added to the user's channel list.

Likewise, if the newly derived channel is saved as a public channel, then the newly derived channel is added to the user's channel list as well as other Users' channel list. After publishing the newly derived channel, other users can easily add the newly derived channel to their respective channel lists. This saves valuable computing resources and improves the computers because insight of one user is easily communicated to the other users saving time and increasing productivity.

Notably, User's ability to modify existing formula and provide a new formula advantageously presents an opportunity for a non-programmer to change formula to meet the needs of user's custom application. A non-programmer user can therefore use a modified version of the analytics tool, wherein the modification is configured to meet the custom needs of user application, without having the user write from scratch the code for the analytics tool.

Referring to FIG. 23 displaying interface 2300 will be described which allows user to initiate a fleet creation process. Upon user selecting the create fleet option 2302, a fleet creation process may be initiated using the interface 2400 shown in FIG. 3.

Figure 24:
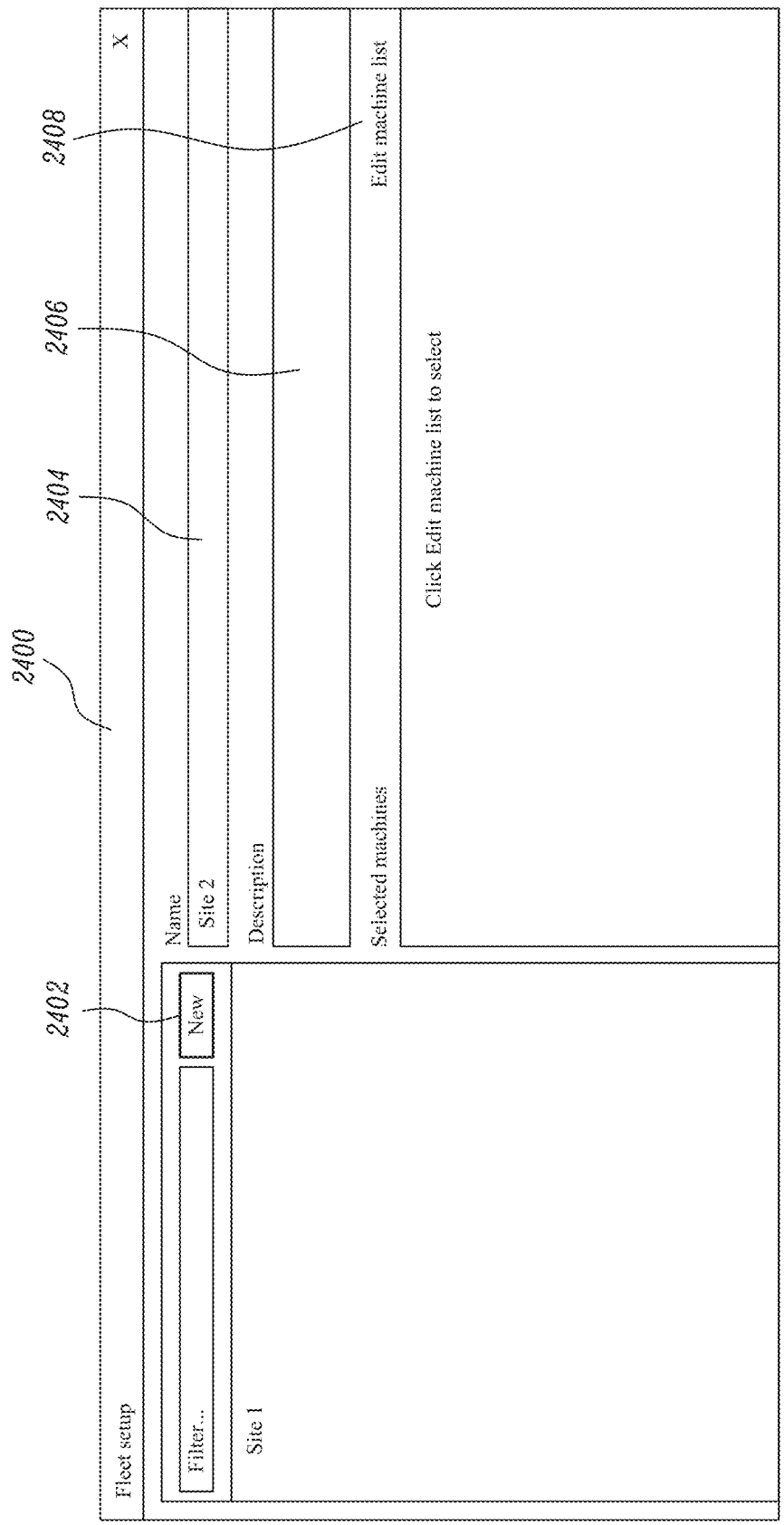
FIG. 24 indicates an illustrative fleet setup interface where user can configure a new fleet setup.

Now turning to FIG. 24, displaying interface 2400, where in order to set up a fleet, user selects a create new fleet option 2402 on interface 2400. Then user can specify a fleet name in a fleet name input area 2404 and provide a description in the fleet description input area 2406. User selecting 'Edit Machine List' option 2408 on interface 2400, interface 2500 shown in FIG. 25 is populated.

Figure 25:
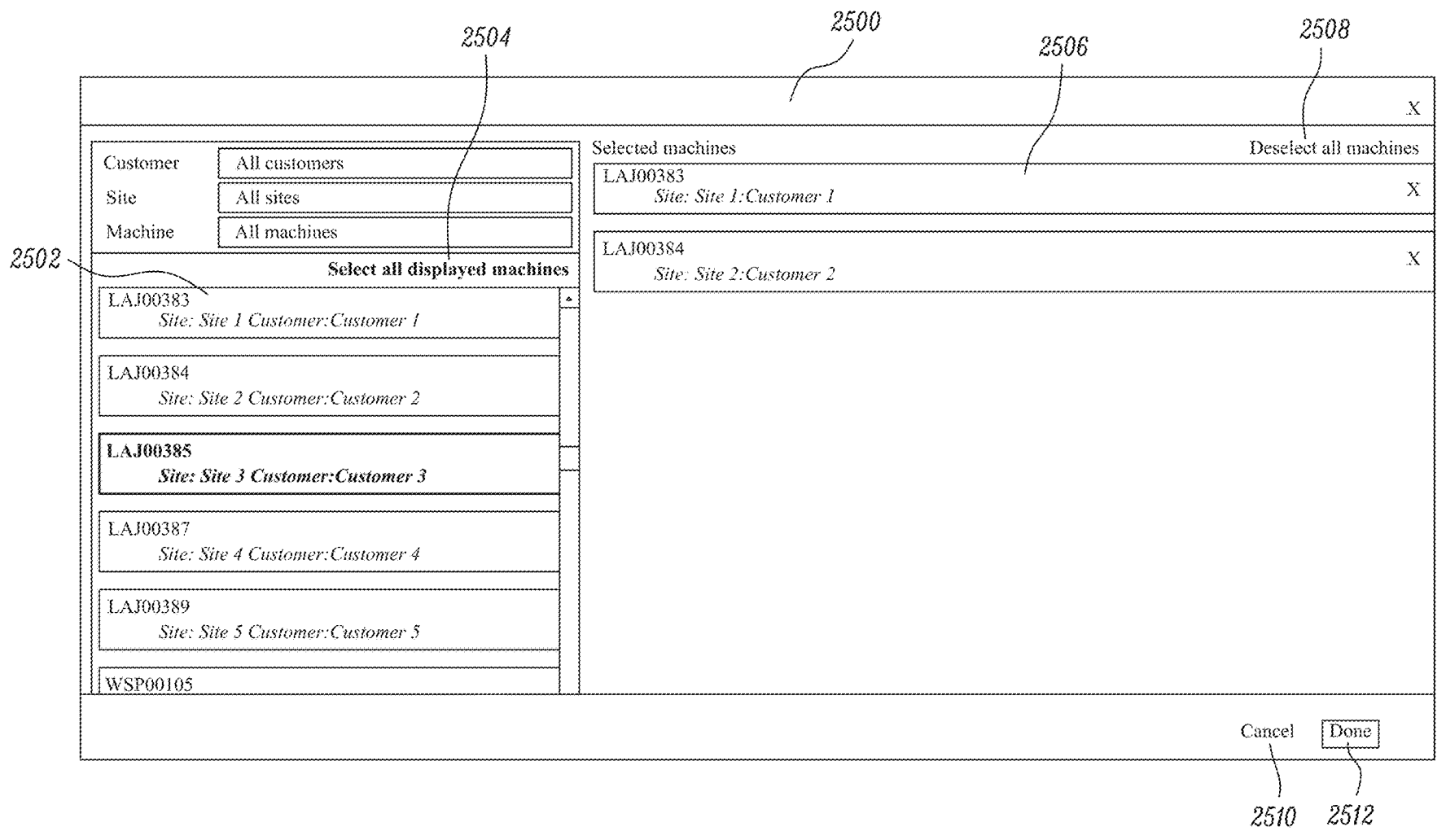

Describing FIG. 25 now, where a list of machines is displayed in the machine display area 2502, user can add any or all of the listed machines to the fleet that user is attempting to create. User can choose to add all or some of the machines displayed in the machine display area 2502 to a selected machines display area 2506, and to ultimately add the selected machines to the fleet that is being created by the user.

To add a specific machine to a new fleet, user may simply select a machine of interest and drag and drop the selected machine from area 2502 to area 2506. Alternatively, user can add all of the machines displayed in the area 2502 to a new fleet by choosing a select all machines option 2504. Conversely, user can undo the selection of the previously selected machines by selecting a deselect all machines option 2508. After selecting machines that are to be added to a new fleet, user can select a cancel option 2510 to abort adding the selected machines to a new fleet. Alternatively, user can select a done option 2512 to add the selected machines to a new fleet. If user selects a done option 2512, a fleet setup interface 2600 is displayed.

Referring now to FIG. 26, showing an interface 2600 showing fleet selection area 2602 showing the newly created fleet "BMA Peak Downs." The machines that have been previously added to the newly created fleet are displayed in the selected machines display area 2604. After creating the fleet and selecting the machines, user can either delete the newly created fleet by selecting a delete option 2606.

Alternatively, user can either abort the fleet creation by selecting a cancel option 2608 or user select a save option 2610 to finally create a new fleet. Once created, the fleet is visible in the list of fleets for the user. Like the view operations described above, user can user can select, edit or delete previously created fleets.

Data visualization is important because it presents an avenue to validate a given analytics model and generate a visual evidence that be shared with customers. Histogram is one way in which the analytics tool visualizes data for user.

Figure 27:
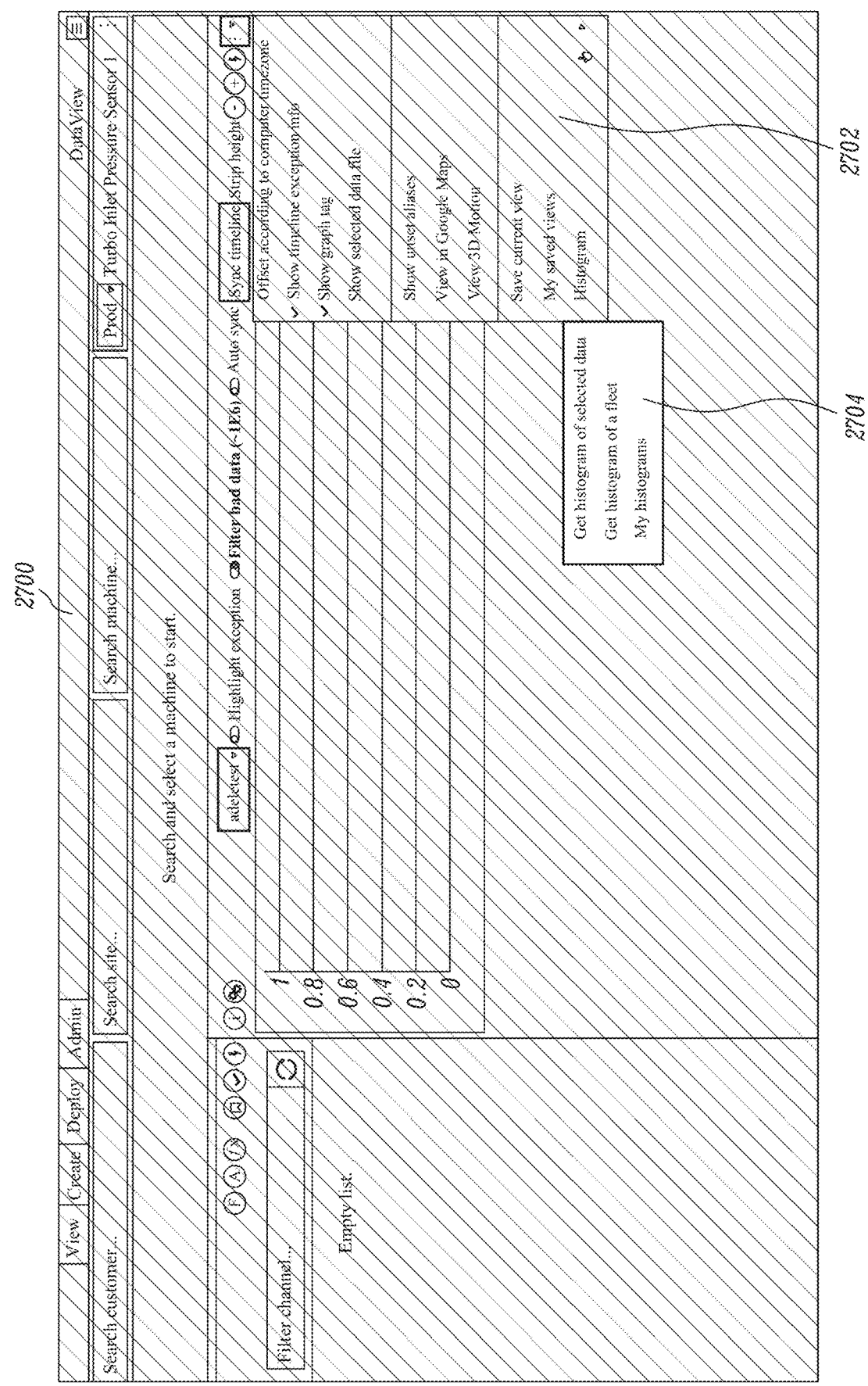
FIG. 27 displays interface where user can select a data operation from various data operations according to one embodiment of the disclosed invention.

Turning to FIG. 27, an interface 2700 shows a drop down list 2702 that allows user to select various data operations, such as such as an option to get histogram of selected data, for fleet and view the saved histograms. Upon user selecting get histograms for a fleet option 2704, interface 2800 is displayed as shown in FIG. 28.

Referring now to FIG. 28, showing an interface 2800, where user can provide parameters for generating a histogram such as name, description, time span, bins, channels and the like. Additionally, user can select to generate a histogram by selecting a fleet of machines via option 2802. Alternatively, user can specify a set of machines for generating a histogram by selecting option 2804. Thus, interface 2800 allows user to visualize histograms of a chosen fleet or of selected data. User can abort the histogram creation by selecting a delete histogram option 2806. Alternatively, user can proceed with histogram generation by selecting a create histogram option 2808. After creating the desired histogram, user can view the histogram by selecting a view plots option 2810.

Figure 29:
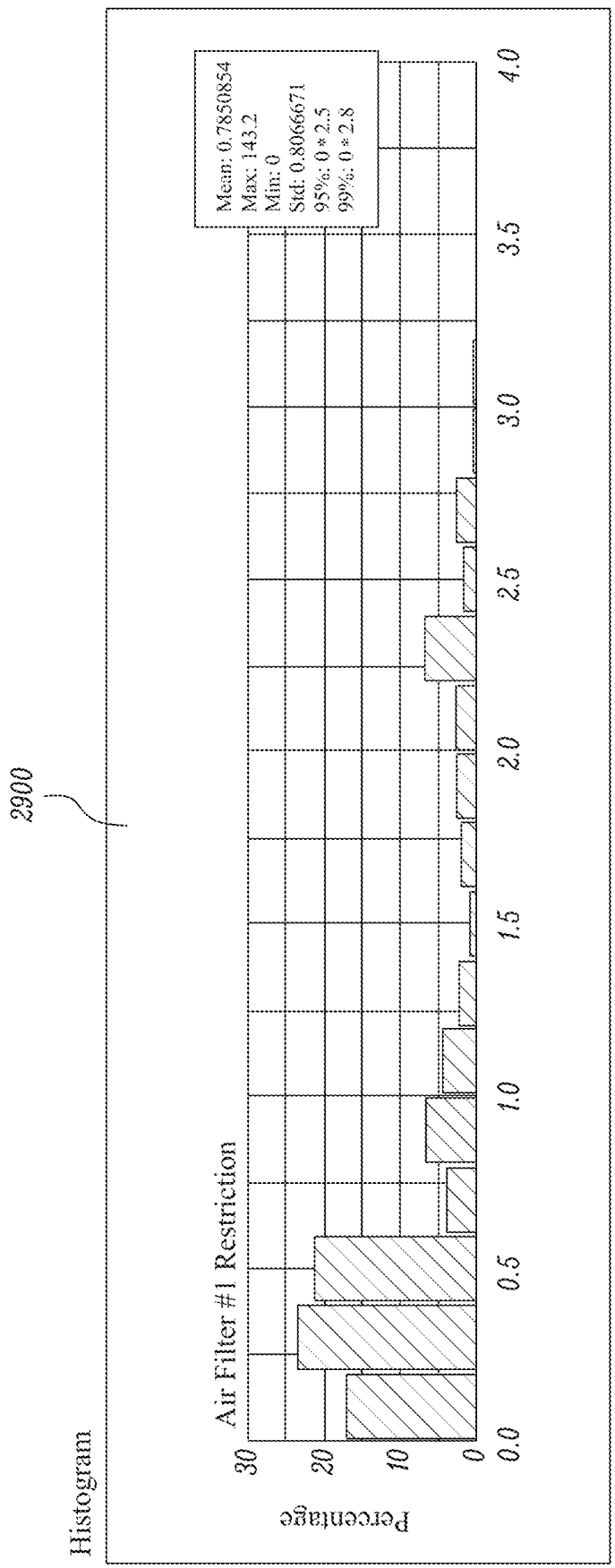
FIG. 29 displays an exemplary histogram generated by one embodiment of the disclosed system.

Now turning to FIG. 29 displaying interface 2900 showing an exemplary histogram generated by one embodiment of the disclosed system.

Figure 30:
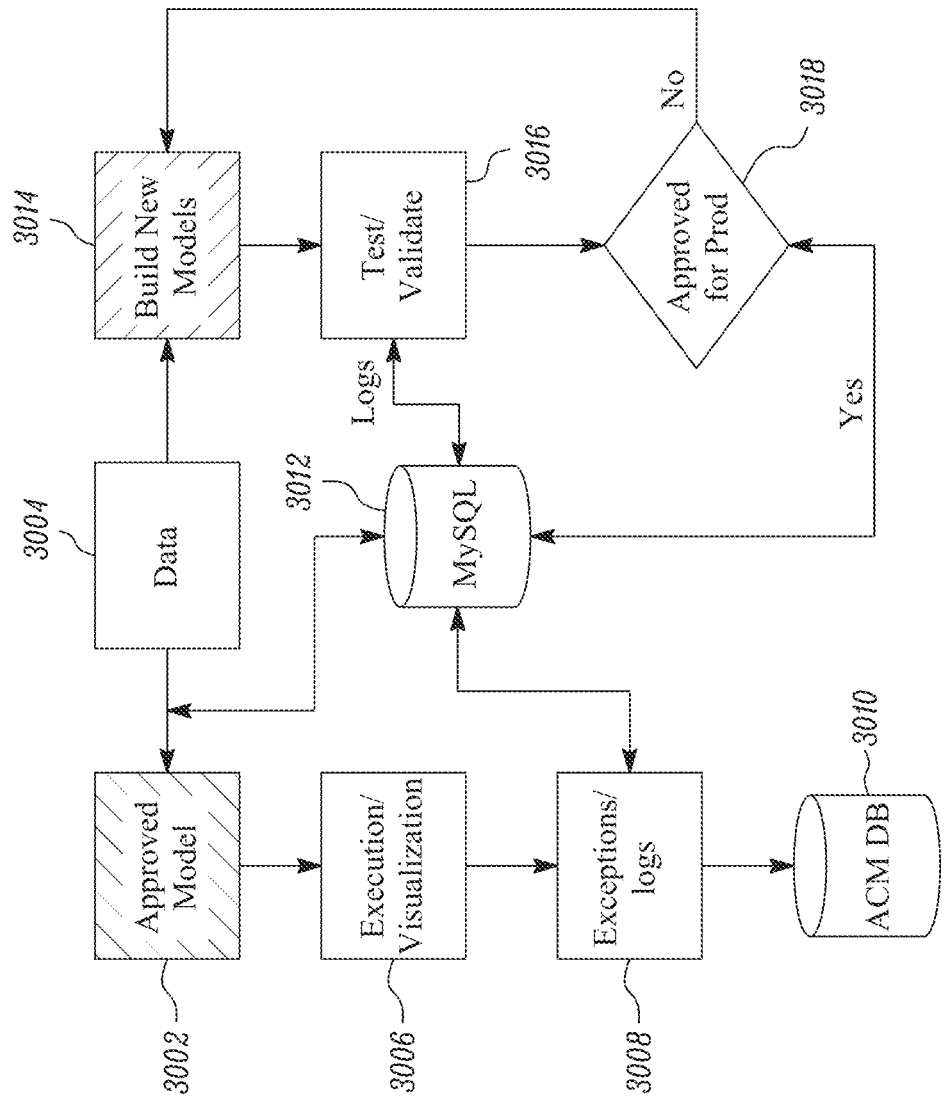
FIG. 30 illustrates a system diagram of various components according to one embodiment of the disclosed system.

Discussing FIG. 30 now, illustrating a system diagram of various components according to one embodiment of the disclosed system. Data 3004 is generally received from many sources, for example data may come from equipment that are running at different locations, data may also be received from external sources such as a dealer database or externally created labelled data.

Once received, data is sent to at least two locations, block 3002 and 3014. In other words, data is sent to (or through) a set of approved analytical models 3002. Additionally, data also sent to block 3014, where a non-data scientist community can build new analytics models based on (1) the insight they develop during the course of using the equipment (2) to meet the needs of their respective applications. At block 3016, the non-data scientist community may test and validate the newly built analytics models. Once the testing is complete and if the newly created analytics models are approved for production at block 3018, then the newly built analytics models are stored in my SQL database 3012.

Alternatively, if the newly built analytics models are not approved for production at block 3018. Subsequently, after recycling the disapproved analytics models in the non-data scientist community pool of yet to be perfected models, the process moves to block 3014. The crowdsourcing community members may work together in attempt to cure defects in these models. Collaboration is a remarkable benefit of the crowdsourcing community. In that, while each community member may not have answers to all questions, collectively, the community may have or come up with answers for most of the questions.

Generally, logs created during the process of testing and validating newly built analytics models can at Block 3016 are stored in my SQL database 3012. If a non-data scientist community member decides to retain the newly created analytics model merely for personal use, then the newly approved analytics model may be stored at MySQL database 3012. However, if a non-data scientist community member agrees to publish the newly approved analytics model, then in addition to being stored at MySQL database 3012, the newly approved analytics model is published and made available to community members and merged in the approved model database at block 3002.

All the analytics models that have been previously created tested and approved on stored in or approved model database 3002. The received data is typically processed by at least one approved model, more specifically, code associated with at least one approved model is executed to generate data visualization at block 3006. Based on the results of the code execution, the logs recording and documenting the encountered exceptions or other similar logs are created at block 3008. The ACM database 3010 stores the logs generated in block 3008 indicating the exceptions that occurred during the execution of the approved analytical models. Similarly, the ACM database 3010 may also store data visualization generated in block 3006. ACM database 3010 is configured all data related to the application according to one embodiment of the disclosed invention.

Accordingly a computer implemented system for dynamically creating and validating a predictive analytics model to transform data into actionable insights is disclosed. The system comprising an analytics server is communicatively connected to: a sensor configured to acquire real-time data output from an electrical system, and a terminal configured to display an indicia of a set of analytics server operations.

The analytics server comprises an event identification circuitry for identifying occurrence of an event, a tagging circuitry for selectively tagging, based on analytics expertise, at least one time series data area (data area), where the identified event occurred. Additionally, the analytics server includes a decision engine for comparing data area where the identified event is tagged with the data area where the identified event is not tagged.

An analytics modeling engine is also a part of the analytics engine, and used for building, based on analytics expertise, the predictive analytics model embodying the classification generated by selective tagging. Furthermore, a terminal communicatively is connected to the analytics server and configured to display the visual indicia generated by executing the predictive analytics model. Further, a feedback engine is also part of the disclosed system, for validating the predictive model based on a feedback from at least one domain expert.

INDUSTRIAL APPLICABILITY

Figure 31:
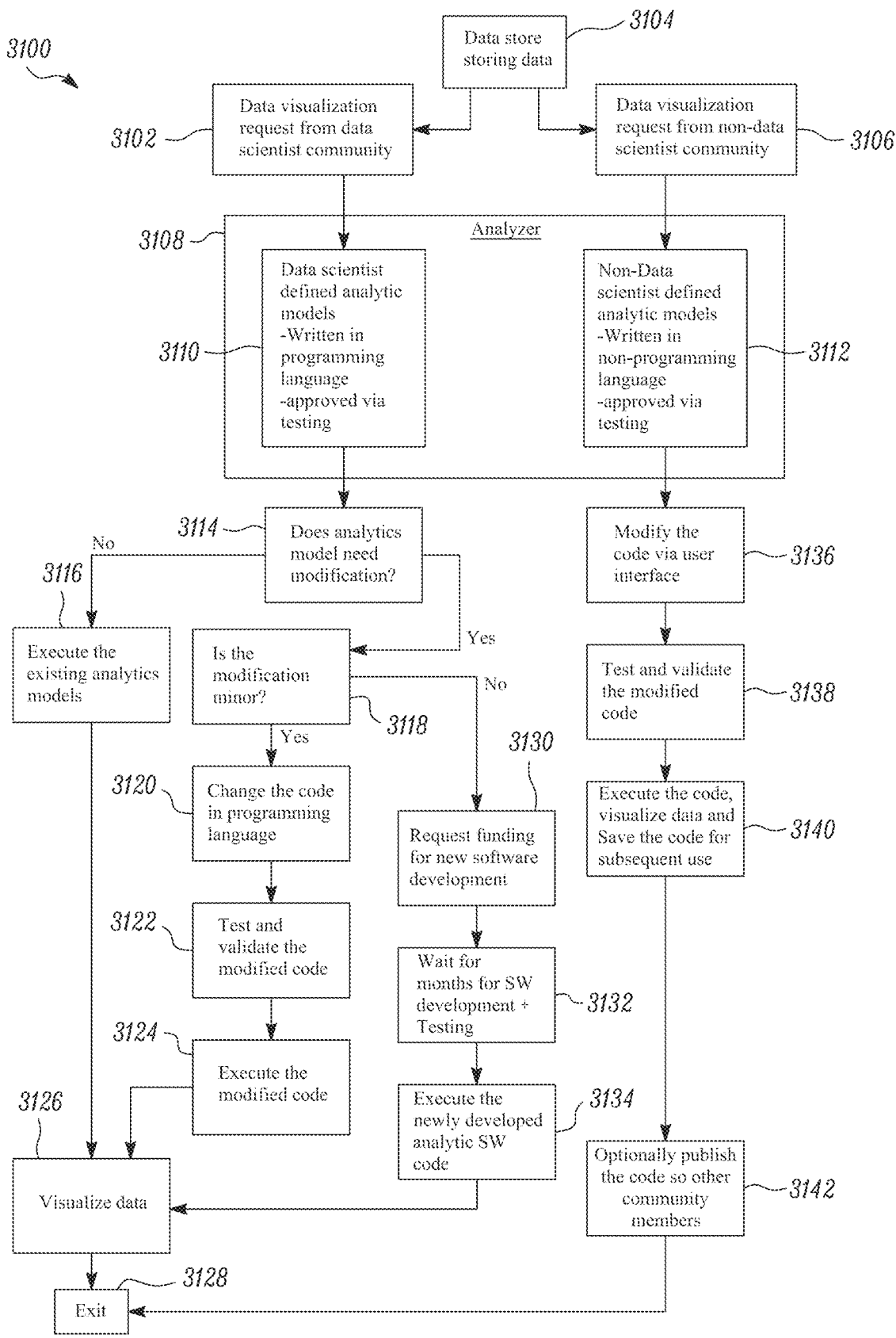
FIG. 31 illustrates a flow chart of the process according to one embodiment of the disclosed system.

Referring now to FIG. 31 a flow chart of the process according to one embodiment of the system is disclosed. The process 3100 begins when a data visualization request is received from a data scientist community member at block 3102 or from a non-data scientist community member at block 3106. The data visualization request can generally contain three sub components, first being identifying the input data to be visualized, such as channels from which data is to be visualized, identifying exceptions for which data is to be captured.

The process of identifying customer, site, machine, or exception for which data is to be visualized, is described in conjunction with FIGS. 2A-2D. The second component of data visualization request is identifying a manner in which input data is to be transformed. This phenomenon is discussed in relation to FIG. 21. The third component of data visualization request is defining a manner in which the transformed data is to be displayed, as discussed, for example in FIGS. 3-5.

The requested data is accessed at block 3104 via a data store or a data warehouse hosting various types of data such as data pertaining to various industries including without limitation energy, manufacturing, aerospace, automotive, chemical, pharmaceutical, telecommunications, retail, insurance, healthcare, financial services, the public sector, and others.

Even though the disclosed invention is described in relation to machine performance data visualization, a person having an ordinary skill in the art will appreciate the fact that disclosed invention is applicable to many other fields.

At block 3108, the analyzer or analytics server can determine the source of data visualization request. If the process determines at block 3110 that analytic model has been presented by a data scientist in a computer programming language and is approved via testing, then the process may move to block 3114 to ascertain if the analytics model needs a modification.

At block 3118, if a determination that the requested modification is minor, then the process moves to block 3120 to change the code in the programming language to implement the desired modification in the analytics model. Thereafter, the process moves to block 3122 test and validate the code before executing the modified code at block 3124. Then after visualizing data at 3126, the process exits at 3128.

Alternatively, if at block 3130, if a determination that the requested modification is major, then the process moves to block 3132 to launch a software development project, and testing. Once the software is developed, the process moves to block 3134 to execute the newly developed analytics code. After visualizing data at block 3126, according to the newly developed software model, the process exits at 3128.

However, if at block 3112, the process determines that analytic model has been presented by a non-data scientist, and written in a non-computer programming language and is approved via testing, then the process moves to block 3136 to modify the code for the analytics model via a user interface according to one embodiment of the disclosed invention.

Next, at block 3138, the process tests and validate the code modified via the user interface and proceeds to execute the modified code to cause data visualization, and optionally save the modified code for subsequent use at block 3140. Additionally, block 3142 after prompting the non-data scientist community member to optionally publish the code, the process exits at block 3128. The publication of analytics model can help other community members so they can use and improve the code through iterative modifications to ultimately improve the quality of the resulting analytics model.

The disclosed system presents many advantages. Some of the exemplary advantageous features of the disclosed system are, including but not limited to: a free-form python syntax editor, providing high performing integrated visualization, derived channel functionality, data creation functionality, feedback loop capability, and the like. Additionally, the disclosed system advantageously incorporates three separate modularized functionalities: data management, analytic modeling, and displaying a user-interface in a single integrated application.

The disclosed system can increase analytics capability while increasing deployment efficiency to produce a competitive advantage. The disclosed system can provide failure models faster. Typically it takes serval months to develop an analytics model of average complexity. Using the disclosed system, as described above, a user can instantaneously create, test and deploy a failure model.

Because a non-data scientist community user has the ability to directly change the algorithm which constitutes only 10% of the code written by the data scientist community, valuable computing resources, and human resources that would otherwise be depleted to modify remaining 90% of the code, are conserved. Accordingly the disclosed system renders improvement to the computer itself.

All of the community members, data scientists and non-data scientists are likely to benefit from newly published analytics model, in that they are likely to (1) readily use the published analytics model as is (2) make minor modifications to the published analytics model to generate a new analytics model based on the published analytics model, to meets the needs of their respective customers (3) build other analytics models based on/on the top of the published analytics models, or build new analytics models based on the insight gained from the published analytics models.

Likewise, crowdsourcing community also shares the insight of the community member (often subject matter experts or end user system expert) publishing the analytics model, and in turn applies the insight and the knowhow to the future analytics models generated via crowdsourcing. The iterative process of creating and sharing increasingly accurate analytics models can indeed be extremely beneficial and valuable for all involved parties. Such evolved analytics model are also likely to perform excellent predictive analysis and prevent future damage.

The disclosed system leads to more accurate predictive analysis because the accuracy of a published model is backed by model validation evidence, in the form of logs of exceptions. Ability to instantaneously share histograms may give community members a chance to verify the alleged accuracy of the published or soon to be published analytics models.

The disclosed system results in an increased volume of analytics models since the disclosed system avails an avenue between the data scientist community and the non-data scientist community. The information and insight exchange among community members is likely to generate leads, requests and subsequent generation of additional failure models.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer implemented system for dynamically creating and validating a predictive analytics model to transform data into actionable insights, the system comprising:
    an analytics server communicatively connected to: (a) a sensor configured to acquire real-time data output from an electrical system, and (b) a terminal configured to display an indicia of a set of analytics server operations; the analytics server comprising:
    an event identification circuitry for identifying an event;
    a tagging circuitry for selectively tagging, based on analytics expertise, at least one time series data area, where the identified event occurred;
    a decision engine for comparing data area where the identified event is tagged with the data area where the identified event is not tagged;
    an analytics modeling engine for building, based on analytics expertise, the predictive analytics model embodying classification generated by the selective tagging;
    a terminal communicatively connected to the analytics server and configured to display the visual indicia generated by executing the predictive analytics model; and
    a feedback engine for validating the predictive analytics model based on a feedback from at least one domain expert,
    wherein the predictive analytics model is iteratively and collaboratively evolved based on the feedback from a community comprising two or more of a dealer community, a condition monitoring advisor community, a data scientist community, and a crowdsourcing community,
    wherein the building of the predictive analytics model includes:
        determining a source of a data visualization request, the source being from a dealer community member of the dealer community or a data scientist community member of the data scientist community, and
        under a condition that the source of the data visualization request is from the dealer community member, creating a new created derived channel to selectively modify an algorithm corresponding to the predictive analytics model, the predictive analytics model previously having been approved via testing, wherein the dealer community member is able to change the algorithm corresponding to the predictive analytics model to meet the needs of dealer business without having to write the code for the entire predictive analytics model, and
    wherein the algorithm corresponding to the predictive analytics model is written in a non-computer programming language.

2. The system of claim 1, wherein the predictive analytics model is generated via a machine learning algorithm.

3. The system of claim 2, wherein the collaborative evolvement of the predictive analytics model produces optimum thresholds range for the predictive analytics model based on at least one of statistical data, engineering experience, product knowledge and industry knowledge.

4. The system of claim 1, wherein predictive analytics model becomes a ground truth once validated by the community.

5. The system of claim 1, wherein the iterative evolvement of the predictive analytics model guards against edge cases, and produces an optimum thresholds range for at least one parameter monitored by the predictive analytics model.

6. The system of claim 1, further comprising:
    a non-data scientist interface for a non-data scientist to search for a particular asset or a group of assets to investigate at least one alert and to provide feedback for the new analytics model without having to code in a computer language; and
    a data scientist user interface for a data scientist to back test the new analytics model for various use cases by verifying analytics results superimposed on machine data.

7. The system of claim 1,
    wherein the analytics server is configured to determine whether the feedback to validate the predictive analytics model is written in a programming language or the non-programming language, and
    wherein the analytics server is configured to modify a portion of code of the predictive analytics model via directly changing the code in a first case where the feedback is written in the programming language and via a user interface in a second case where the feedback is written in the non-programming language.

8. A method for dynamically creating and validating a predictive analytics model to transform data into actionable insights the method comprising:
   identifying an event;
   selectively tagging, based on analytics expertise, at least one time series data area, where the identified event occurred;
   comparing data area where the identified event is tagged with the data area where the identified event is not tagged;
   building, based on analytics expertise, the predictive analytics model embodying classification generated by said selective tagging;
   displaying the visual indicia generated by executing the predictive analytics model; and
   validating the predictive analytics model based on a feedback from at least one domain expert,
   wherein the predictive analytics model is iteratively and collaboratively evolved based on the feedback from a community comprising two or more of a dealer community, a condition monitoring advisor community, a data scientist community, and a crowdsourcing community,
   wherein said building the predictive analytics model includes:
      determining a source of a data visualization request, the source being from a dealer community member of the dealer community or a data scientist community member of the data scientist community, and
      under a condition that the source of the data visualization request is from the dealer community member, creating a new created derived channel to selectively modify an algorithm corresponding to the predictive analytics model, the predictive analytics model previously having been approved via testing, wherein the dealer community member can change the algorithm corresponding to the predictive analytics model to meet the needs of dealer business without having to write the code for the entire predictive analytics model, and
   wherein the algorithm corresponding to the predictive analytics model is written in a non-computer programming language.

9. The method of claim 8, wherein the predictive analytics model is generated via a machine learning algorithm.

10. The method of claim 9, wherein the collaborative evolvement of the predictive analytics model produces optimum thresholds range for the predictive analytics model based on at least one of statistical data, engineering experience, product knowledge and industry knowledge.

11. The method of claim 8, wherein predictive analytics model becomes a ground truth once validated by the community.

12. The method of claim 8, wherein the iterative evolvement of the predictive analytics model guards against edge cases, and produces an optimum thresholds range for at least one parameter monitored by the predictive analytics model.

13. The method of claim 8, further comprising:
   providing a non-data scientist interface for a non-data scientist to search for a particular asset or a group of assets to investigate at least one alert and to provide feedback for the new analytics model without having to code in a computer language; and
   providing a data scientist user interface for a data scientist to back test the new analytics model for various use cases by verifying analytics results superimposed on machine data.

14. The method of claim 8, further comprising modifying a portion of code of the predictive analytics model via directly changing the code in a first case where the feedback is written in a programming language and via a user interface in a second case where the feedback is written in a non-programming language.

* * * * *